United States Patent
Gillen

(10) Patent No.: US 11,922,363 B2
(45) Date of Patent: Mar. 5, 2024

(54) COUNTERPARTY PHYSICAL PROXIMITY VERIFICATION FOR DIGITAL ASSET TRANSFERS

(71) Applicant: United Parcel Service of America, Inc., Atlanta, GA (US)

(72) Inventor: Robert J. Gillen, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 820 days.

(21) Appl. No.: 16/125,053

(22) Filed: Sep. 7, 2018

(65) Prior Publication Data

US 2019/0019144 A1   Jan. 17, 2019

Related U.S. Application Data

(63) Continuation-in-part of application No. 16/027,523, filed on Jul. 5, 2018.
(Continued)

(51) Int. Cl.
*G06Q 20/40* (2012.01)
*G06Q 10/0833* (2023.01)
(Continued)

(52) U.S. Cl.
CPC ....... *G06Q 10/0833* (2013.01); *H04L 9/0872* (2013.01); *H04L 9/3213* (2013.01);
(Continued)

(58) Field of Classification Search
CPC ........ G06Q 40/04; G06Q 20/02; G06Q 20/06; G06F 21/64; H04L 2209/38
(Continued)

(56) References Cited

U.S. PATENT DOCUMENTS 7,512,989 B2 * 3/2009 Scott ................... H04L 63/0428
380/284
7,926,095 B1 * 4/2011 Weiner .................. H04L 9/3236
726/7
(Continued)

FOREIGN PATENT DOCUMENTS

WO   2016/128569 A1   8/2016

OTHER PUBLICATIONS

"Shashwat Raizada et al., Nearby-Friend Discovery Protocol for Multiple Users, 2009 International Conference on Computational Science and Engineering" (Year: 2009).*
(Continued)

*Primary Examiner* — Steven S Kim
*Assistant Examiner* — Sima Asgari
(74) *Attorney, Agent, or Firm* — Shook, Hardy & Bacon L.L.P.

(57) ABSTRACT

Embodiments are provided for verifying physical proximity of counterparties in digital asset transfers. A sender device receives a recipient hash and a recipient address are received, where recipient hash is generated by the recipient device based on each of the associated recipient address and a first set of location parameters. The sender device obtains a second set of location parameters that corresponds to a detected physical location thereof. The sender device employs the obtained second set of location parameters to decipher the recipient hash, and generates a request to transfer a digital token from a sender address associated with the sender device to the recipient address based on a determination that the deciphered recipient hash corresponds to the received recipient address.

13 Claims, 8 Drawing Sheets

Related U.S. Application Data

(60) Provisional application No. 62/528,785, filed on Jul. 5, 2017.

(51) Int. Cl.
  *H04L 9/08* (2006.01)
  *H04L 9/32* (2006.01)
  *H04L 9/00* (2022.01)

(52) U.S. Cl.
  CPC .......... *H04L 9/3236* (2013.01); *H04L 9/3242* (2013.01); *H04L 9/3247* (2013.01); *H04L 9/3297* (2013.01); *G06Q 2220/00* (2013.01); *H04L 9/50* (2022.05)

(58) Field of Classification Search
  USPC .......................................................... 705/50
  See application file for complete search history.

(56) References Cited

U.S. PATENT DOCUMENTS

| | | | |
|---|---|---|---|
| 8,213,617 B1* | 7/2012 | Appleton | H04W 4/023 380/255 |
| 9,876,693 B1 | 1/2018 | Davidson | |
| 10,182,305 B2 | 1/2019 | Gillen | |
| 10,575,136 B2 | 2/2020 | Gillen | |
| 11,023,846 B2 | 6/2021 | Gillen et al. | |
| 2014/0192737 A1 | 7/2014 | Belghoul et al. | |
| 2015/0066798 A1 | 3/2015 | Gillen et al. | |
| 2015/0227890 A1 | 8/2015 | Bednarek et al. | |
| 2015/0287026 A1 | 10/2015 | Yang et al. | |
| 2016/0316322 A1 | 10/2016 | Gillen | |
| 2017/0017955 A1 | 1/2017 | Stern et al. | |
| 2017/0046664 A1 | 2/2017 | Haldenby et al. | |
| 2017/0083907 A1 | 3/2017 | Mcdonough et al. | |
| 2017/0091699 A1* | 3/2017 | Mueller | G06Q 20/3224 |
| 2017/0109744 A1* | 4/2017 | Wilkins | H04L 9/3236 726/7 |
| 2017/0366686 A1 | 12/2017 | Yamguchi | |
| 2018/0137453 A1 | 5/2018 | Gillen | |
| 2018/0232693 A1 | 8/2018 | Gillen et al. | |
| 2019/0141468 A1 | 5/2019 | Gillen | |
| 2019/0199518 A1 | 6/2019 | Rady | |
| 2020/0177377 A1 | 6/2020 | Smith et al. | |
| 2020/0389301 A1 | 12/2020 | Detres et al. | |
| 2021/0272184 A1 | 9/2021 | Passy | |

OTHER PUBLICATIONS

Ye et al. Private and Flexible Proximity Detection based on Geohash, IEEE Jun. 1, 2017 (Year: 2017).*

International Search Report and Written Opinion received for PCT Patent Application No. PCT/US2018/040894, dated Sep. 14, 2018, 8 pages.

First Action Interview Office Action received for U.S. Appl. No. 16/027,523, dated Jul. 27, 2022, 37 pages.

Preinterview First Office Action received for U.S. Appl. No. 16/027,523, dated Mar. 24, 2022, 36 pages.

Final Office Action received for U.S. Appl. No. 16/027,523, dated May 23, 2023, 38 pages.

Hepp et al., "Securing Physical Assets on the Blockchain", Association for Computing Machinery Available online at <https://dl.acm.org/doi/abs/10.1145/3211933.3211944>, Jun. 15, 2018, pp. 60-65.

Notice of Allowance received for U.S. Appl. No. 16/027,523, dated Oct. 3, 2023, 17 Pages.

* cited by examiner

COUNTERPARTY PHYSICAL PROXIMITY VERIFICATION FOR DIGITAL ASSET TRANSFERS

CROSS-REFERENCE TO RELATED APPLICATIONS

This application is a continuation-in-part application entitled "Counterparty Physical Proximity Verification" claims priority to U.S. application Ser. No. 16/027,523 and entitled "Verifiable Parcel Tracking System," filed Jul. 5, 2018, which claims priority to U.S. Application No. 62/528, 785, filed Jul. 5, 2017, entitled "Electronic Distributed Parcel Shipping and Tracking Ledger Systems," the contents of which are incorporated in their entirety by reference.

INTRODUCTION

Distributed ledgers generally relate to the technical field of computer science. Generally, distributed ledgers address how information is stored and maintained. In addition, distributed ledgers also address the technical field of data security. For instance, distributed ledgers may create an immutable digital platform so that the information contained therein may not be easily manipulated. Even more, the present disclosure solves at least one technological problem. For instance, problems exist in conventional technology associating a digital transaction with a physical location and/or a physical asset. However, the technology described herein can offer particular technological solutions in how digital data/transactions are associated with a physical asset and/or physical location.

In addition, shipping consumers are constantly looking for new shipping services providing enhanced parcel shipping/tracking visibility while minimizing costs. As new parcel transportation methodologies such as crowd-sourced parcel delivery networks become more commonplace, a need exists for verifiable parcel shipping and tracking visibility systems providing parcel location visibility for parcels transported and/or exchanged within a single parcel carrier, as well as for parcels transported and/or exchanged between multiple parcel carriers as the parcel is transported from a shipment origin to a shipment destination. By employing the technology described herein, enhanced parcel shipping/tracking visibility may be provided while minimizing costs.

SUMMARY

Embodiments of the present invention relate to, among other things, enhanced distributed ledger systems. Conventional technology has generally failed to provide an adequate or reliable solution to store verifiable information associated with transfer of physical/digital assets between parties. For instance, conventional technology has not provided an adequate means for associating a digital transaction with a physical transfer of a physical asset at a physical location. As such, embodiments described herein can overcome the deficiencies associated with conventional technology.

For example, in one embodiment, a computer-implemented method is provided for verifying physical proximity of counterparties in digital asset transfers. The method may comprise receiving, from a recipient device, a recipient hash and a recipient address associated with the recipient device, wherein the recipient hash is generated by the recipient device based on each of the associated recipient address and a first set of location parameters that corresponds to a detected physical location of the recipient device. Additionally, the method comprises obtaining, by a sender device, a second set of location parameters that corresponds to a detected physical location of the sending device. The method further comprises employing, by the sender device, the obtained second set of location parameters to decipher the recipient hash. The method also comprises generating, by the sender device, a request to transfer a digital token from a sender address associated with the sender device to the recipient address based on a determination that the deciphered recipient hash corresponds to the received recipient address.

In another embodiment, a computer-implemented method is provided for verifying physical proximity of counterparties in digital asset transfers. The method comprises obtaining, by a recipient device, a first set of location parameters that corresponds to a detected physical location of the recipient device. The method additionally comprises generating, by the recipient device, a recipient hash based on each of the obtained first set of location parameters and a recipient address associated with the recipient device. Further, the method comprises providing, by the recipient device, the associated recipient address and the generated recipient hash to a sender device, wherein the sender device is configured to initiate a transfer of a digital token from a sender address associated with the sender device to the associated recipient address based on a determination that the provided recipient hash, deciphered with a second set of location parameters, corresponds to the received recipient address, the second set of location parameters corresponding to a detected physical location of the sender device. The method also comprises generating, by the recipient device, a notification that the transfer of the digital token is complete based on another determination that a transaction corresponding to the transfer is stored on a distributed ledger.

In yet another embodiment, a computing device is provided for verifying physical proximity of counterparties in digital asset transfers. The computing device comprises a proximity verification component for verifying that another computing device is in physical proximity to the computing device to enable transfer of a digital token from a first address associated with the computing device to a second address associated with the other computing device, wherein the physical proximity is verified based on a determination that a first hash, received from the other computing device and deciphered with a set of location parameters corresponding to a detected location of the computing device, corresponds to the second address received from the other computing device.

The computing device may further comprise a token receiving component for providing the other computing device with the first address and a second hash, the second hash being generated based on a set of location parameters that corresponds to a detected location of the computing device. Additionally, the computing device may comprise a token transferring component for generating a digitally-signed transaction that includes a request to transfer the digital token from the first address to the second address based on the determination that the received and deciphered hash corresponds to the second address. The computing device may also comprise a distributed ledger interfacing component for accessing a node of a plurality of nodes that collectively maintain a distributed ledger to transmit the generated transaction to the node. The computing device may further comprise a token transfer verifying component for determining that the node, having the distributed ledger stored thereon, includes the generated transaction.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
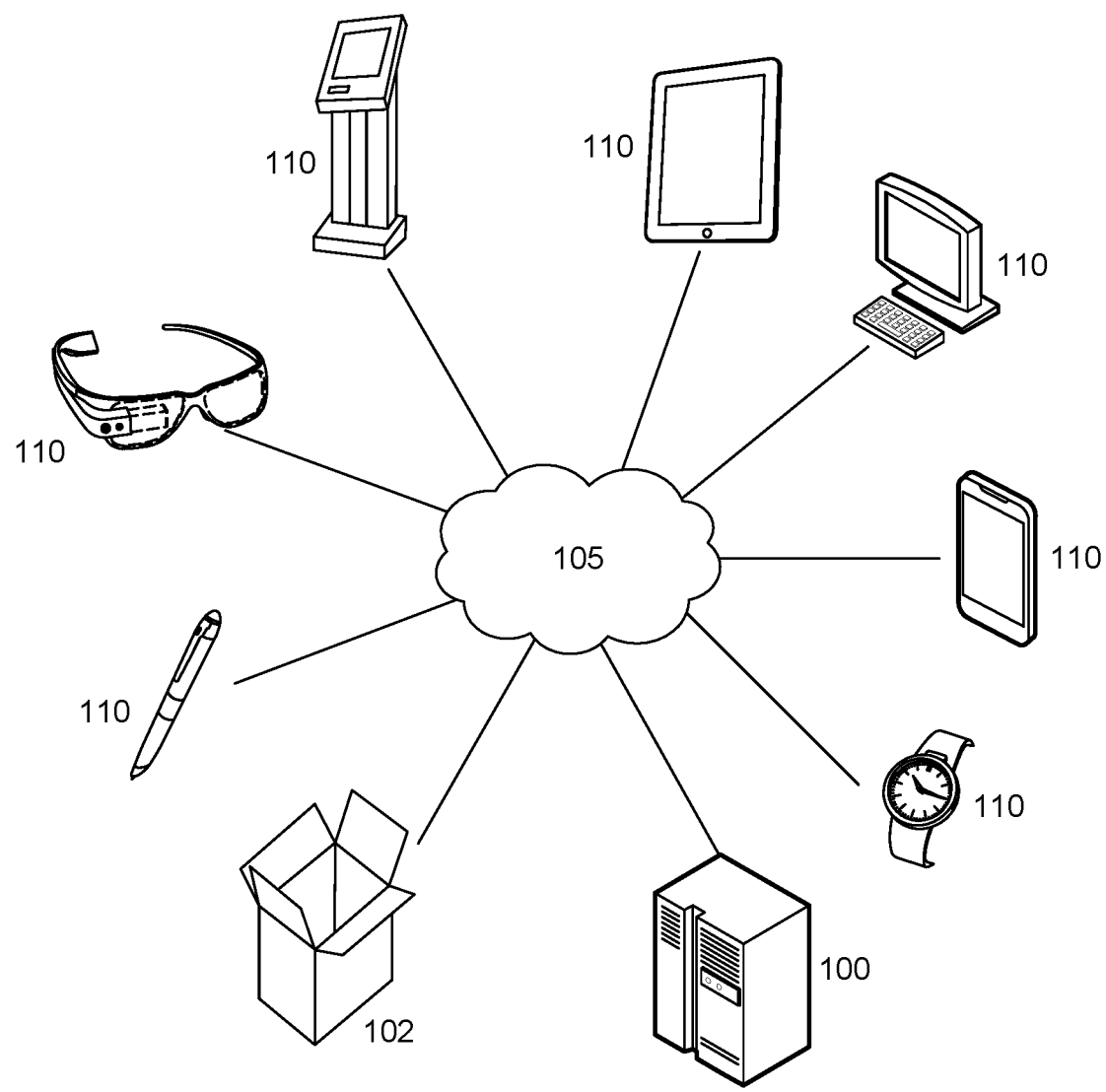
FIG. 1 is a diagram of a system that can be used to practice various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Various embodiments provide systems and methods for providing verifiable parcel and/or item shipping/visibility information via a distributed ledger (e.g., blockchain) database. The distributed ledger database system may be a public, consortium, or private database, and may be stored on a plurality of computing nodes to provide backup storage and/or to provide transaction verification mechanisms as discussed herein. It is contemplated that the described embodiments can facilitated utilizing one or more distributed ledger databases that are in communication with one another, whether through sidechains, cross-chain transactions, or other technologies generally known to one of ordinary skill. As used herein, the terms "blockchain" and/or "distributed ledger" may also be referred to as distributed ledger technology ("DLT").

In certain embodiments, the distributed ledger system may comprise data indicative of transfers of physical assets, digital assets, or a combination thereof, in a plurality of transactions/blocks, wherein later-in-time generated transactions/blocks are electronically linked to prior-generated transactions/blocks to provide a completely linked block chain indicative of each transaction for which information/data is stored in the distributed ledger. Moreover, each transaction/block may comprise information/data identifying one or more particular parcels and/or items (e.g., parcel level detail providing a plurality of information/data points relating to a particular parcel), and may comprise one or more control identifiers and/or digital addresses that are each indicative of an entity, individual, and/or location having prior, present, or future control over the parcel and/or item.

It is contemplated that each block of the distributed ledger database described herein can comprise of one or more transactions, and as such, references to a transaction/block can include a single transaction of multiple transactions in a single block, or a single transaction that is associated with a block by itself. Accordingly, by identifying all transactions/blocks stored in the distributed ledger relating to a particular parcel and/or item, a complete chain-of-control may be identified for a particular parcel and/or item. The term "control" as referenced herein can relate to "physical possession," whether the term is used independently or in conjunction with other terms.

In various embodiments, each new transaction/block may be generated upon receipt of information/data indicating a change in control of a stored parcel and/or item (e.g., received by a computer node). For example, each time control of a parcel moves from a first carrier personnel (e.g., a sort personnel) to a second carrier personnel (e.g., a delivery driver/delivery vehicle), a new transaction/block may be generated for the distributed ledger. In a further example a new transaction/block may be generated for the distributed ledger when a parcel moved into (e.g., when a consignee presents a parcel to a carrier) or when a parcel exits the carrier's network (e.g., when the parcel is delivered to a person or physical address). In certain embodiments, a plurality of transaction computing devices may be configured to monitor and/or update control information/data for a plurality of parcels and/or items, based on wireless communication between a plurality of transaction computing devices, the parcel and/or item, and/or the like. For example, each time a parcel is scanned (e.g., via a barcode scanner), a new transaction/block may be generated in the distributed ledger to reflect the newly identified location of the parcel. It is further contemplated that each transaction can be associated with and/or include a timestamp that is generated by the scanning device, or a node of the distributed ledger upon receiving the transaction.

Some embodiments may comprise a plurality of linked distributed ledgers (e.g., a first distributed ledger relating to parcels/containers and a second distributed ledger relating to items within the parcels), each providing varying information/data regarding respective asset types (e.g., items and/or parcels). Thus, certain embodiments enable tracking of parcels and items within those parcels/containers separately, thereby enabling the use of various smart contracts relating to shipping services and item handling separately.

In some further embodiments, smart contracts may be automatically enforceable to transfer value (e.g., in the form or digital assets or crypto currencies) between various parties involved in shipping transactions based on the occurrence of various trigger events. Those trigger events, such as the pick-up/transfer/delivery of a parcel, the occurrence of an undesirable environmental condition, and/or the like, may be identified in information/data stored in one or more transactions/blocks relating to a particular parcel and/or item. Thus, based on information/data added to the distributed ledger (e.g., as one or more transactions/blocks), the distributed ledger system may be configured to automatically transfer value between a plurality of parties. For example, upon successful pick-up/transfer/delivery of a parcel, value (e.g., in the form of digital currency) may be transferred from a parcel consignor to a carrier. Upon a determination that a particular item's temperature was allowed to exceed a predefined threshold, value may be transferred from the carrier to a consignor. The amount of value to be transferred may be assigned based on the item and/or parcel for which a smart contract is related. For example, the maximum amount of value that may be transferred relating to a particular parcel may be limited to the value of shipping services provided, and the maximum amount of value that may be transferred relating to a particular item may be limited to the value of the item itself. Thus, if a parcel is not delivered in accordance with agreed upon parameters, the consignor may receive a refund of at least a portion of the value of the shipping services (or may pay the carrier less than the agreed-upon shipping services value); and if an item is damaged/destroyed during shipping, the carrier may pay the consignor at least a portion of the value of the damaged/destroyed item.

Computer Program Products, Methods, and Computing Devices

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing devices, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an illustration of an exemplary embodiment of the present disclosure. As shown in FIG. 1, this particular embodiment may include one or computing nodes 100, one or more networks 105, one or more credentialing devices, one or more verification/validation devices, and/or one or more transaction computing devices 110 (e.g., handheld computing devices, IoT enabled shipping containers or devices, parcels and/or items, and/or the like). Each of these components, devices, systems, and similar words used herein interchangeably may be in direct or indirect communication with, for example, one another over the same or different wired or wireless networks and may cooperatively generate data so that the one or more computing nodes 100 can form a distributed ledger (e.g., blockchain) for tracking various digital transactions and/or physical (real-world) activities. As discussed herein, the computing devices (e.g., computing nodes 100, physical asset 102, and/or transaction computing devices 110) may be in electronic communication with one or more third party distributed ledgers (e.g., Bitcoin, Ethereum, Hyperledger Fabric, Ripple, Quorum, Corda and/or the like), based on whether the third party distributed ledger is permissioned or otherwise public. Additionally, while FIG. 1 illustrates the various system devices as separate, standalone devices, the various embodiments are not limited to this particular architecture.

Exemplary Computing Nodes

Figure 2:
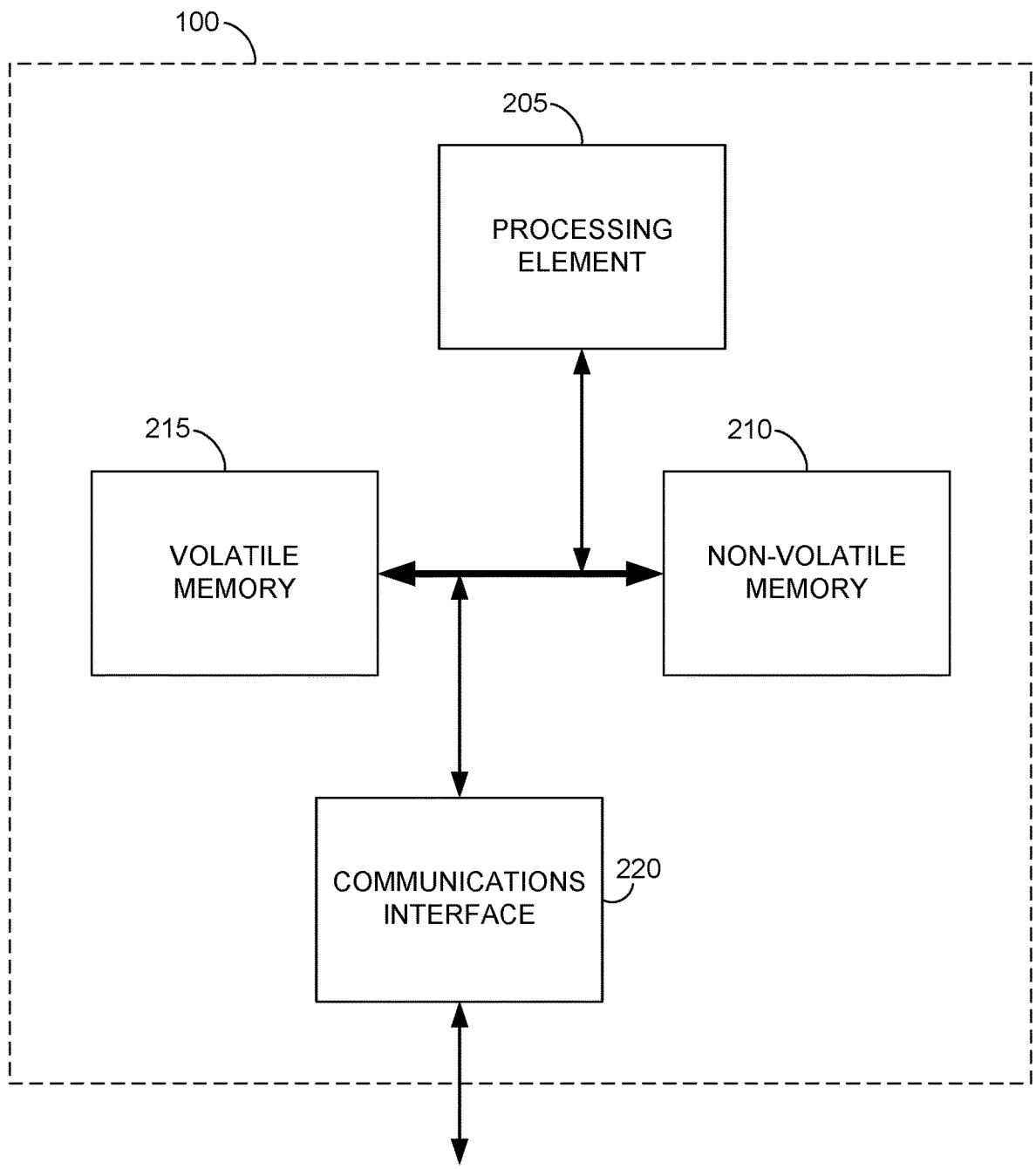
FIG. 2 is a schematic of a computing node in accordance with certain embodiments of the present disclosure.
Figure 3:
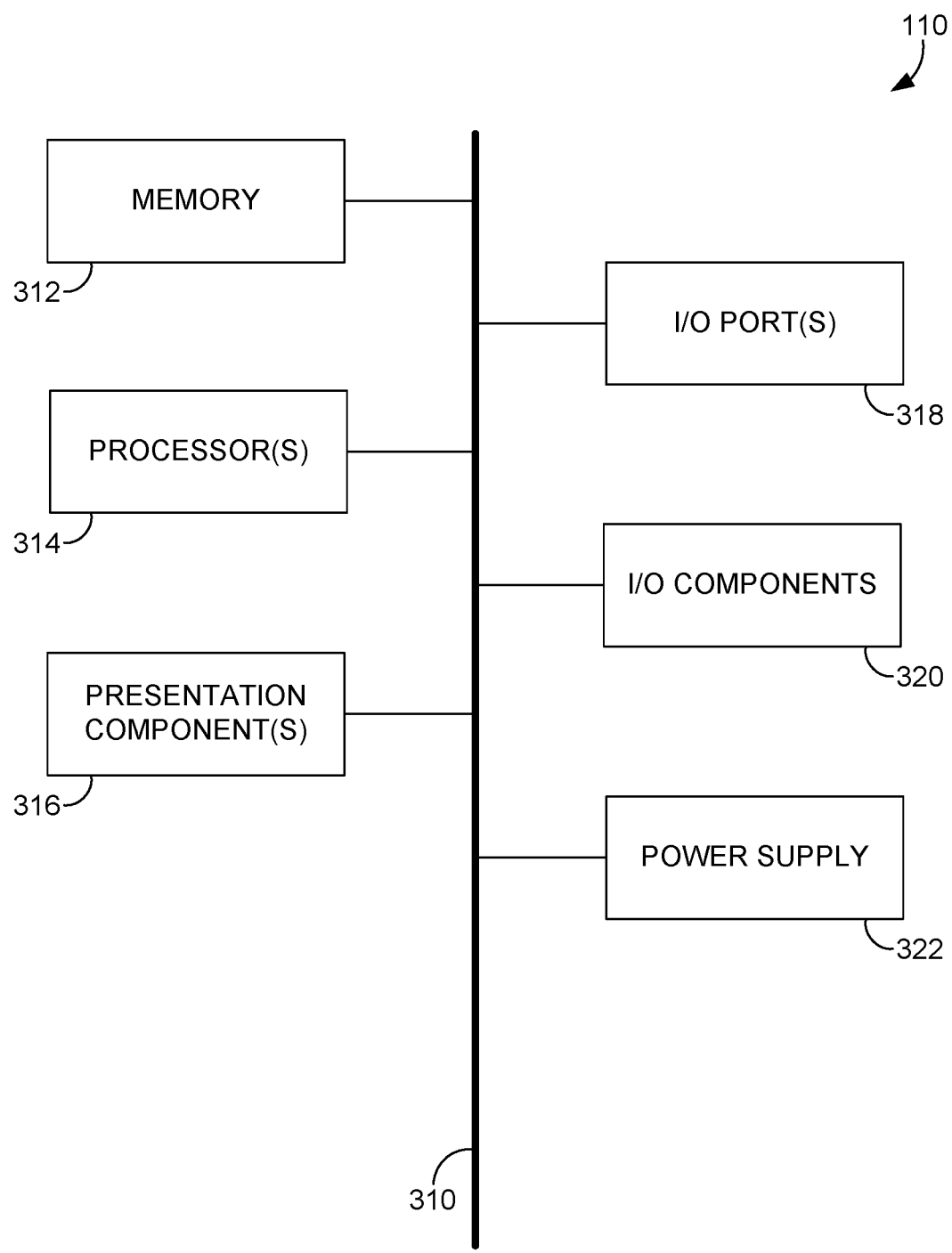
FIG. 3 is a schematic of a computing entity in accordance with certain embodiments of the present disclosure.

FIG. 2 provides a schematic of a computing node 100 according to one embodiment of the present disclosure. Initially, the computing node 100 may be a computing device 110 that is depicted in FIG. 3. Similarly, in certain embodiments, the computing device 110 may be a computing node 100. Accordingly, any description of components and/or features of the computing node 100 may be applicable to the computing device 110. Additionally, any description of components and/or features of the computing device 110 may be applicable to the computing node 100. In general, the terms computing entity, computer, entity, device, system, and/or similar words used herein interchangeably may refer to, for example, one or more computers, computing devices, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the computing node 100 may also include one or more communications interfaces 220 for communicating with various computing devices in a wired or wireless manner, such as by communicating data, content, information, and/or similar terms used herein interchangeably, each which can be transmitted, received, operated on, processed, displayed, stored, and/or the like. It is further contemplated that the communication interfaces 220 can communicate the foregoing directly (e.g., optically utilizing QR codes, bar codes, or infra-red, or wirelessly with near-field communications or radio, among other things) or indirectly (e.g., via a network, such as a LAN or the Internet).

As shown in FIG. 2, in one embodiment, the computing node 100 may include or be in communication with one or more processing elements 205 (also referred to as processors, processing circuitry, and/or similar terms used herein interchangeably) that communicate with other elements within the computing node 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing devices, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the computing node 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., item/shipment database 40), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In one embodiment, the computing node 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the computing node 100 with the assistance of the processing element 205 and operating system.

As indicated, in one embodiment, the computing node 100 may also include one or more communications interfaces 220 for communicating with various computing devices, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the computing node 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the computing node 100 may include or be in communication with one or more input elements, such as a keyboard input, a mouse input, a touch screen/display input, motion input, movement input, audio input, pointing device input, joystick input, keypad input, and/or the like. The computing node 100 may also include or be in communication with one or more output elements (not shown), such as audio output, video output, screen/display output, motion output, movement output, and/or the like.

In one embodiment, the computing node 100 may include various payment features and functionalities. Payments (received or paid) may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, BlueTooth low energy (BLE), and various other contactless payment systems. Further, such payment technologies may include PayPal Beacon, Booker, Erply, Leaf, Leapset, Micros, PayPal Here, Revel, ShopKeep, TouchBistro, Vend, and/or the like.

As will be appreciated, one or more of the computing node's 100 components may be located remotely from other computing node 100 components, such as in a distributed system. Furthermore, one or more of the components may be combined and additional components performing functions described herein may be included in the computing node 100. Thus, the computing node 100 can be adapted to accommodate a variety of needs and circumstances. As will be recognized, these architectures and descriptions are provided for exemplary purposes only and are not limiting to the various embodiments.

Exemplary Computing Device

With reference to FIG. 3, computing device 110 may include a bus 310 that directly or indirectly couples the following devices: memory 312, one or more processors 314, one or more presentation components 316, input/output (I/O) ports 318, input/output components 320, and illustrative power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 3 and reference to "computing device."

Computing device 110 typically includes a variety of computer-readable media. Computer-readable media can be any available media that can be accessed by computing device 110 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 110. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 312 includes computer storage media in the form of volatile and/or nonvolatile memory. The memory may be removable, non-removable, or a combination thereof. Exemplary hardware devices include solid-state memory, hard drives, optical-disc drives, etc. Computing device 110 includes one or more processors that read data from various devices such as memory 312 or I/O components 320. Presentation component(s) 316 present data indications to a user or other device. Exemplary presentation components include a display device, speaker, printing component, vibrating component, etc.

I/O ports 318 allow computing device 110 to be logically coupled to other devices including I/O components 320, some of which may be built in. Illustrative components include a microphone, joystick, game pad, satellite dish, scanner, printer, wireless device, etc. The I/O components 320 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 110. The computing device 110 may be equipped with depth cameras, such as, stereoscopic camera systems, infrared camera systems, RGB camera systems, and combinations of these for gesture detection and recognition. Additionally, the computing device 110 may be equipped with accelerometers or gyroscopes that enable detection of motion.

Exemplary Transaction Computing Devices

Transaction computing devices may be utilized to perform low-level transaction functions, such as generating and/or transmitting data to initialize a transaction to be recorded via a distributed ledger (e.g., blockchain) or other transactional recordation system. In exemplary embodiments, the transacting computing entity may be the computing device 110. Additionally, the transaction computing entity 110 may be associated with one or more entities, such as a transferor and/or a transferee. Transactional computing devices may be embodied as mobile transactional computing devices, such as mobile phones, PDAs, laptop computers, scanning devices, autonomous delivery vehicles, and/or the like, such that the transactional computing devices may be transported to physical locations where a transaction is to be consummated. However, various transactional computing devices may be stationary in nature (e.g., desktop computing devices, gaming consoles, servers, smart locations (e.g., a locker box, a home enabled with smart locks), and/or the like). Moreover, in certain embodiments, transaction computing devices may be embodied as Internet of Things (IoT) enabled physical asset, such as parcels, items, and/or the like. As discussed herein, the IoT enabled parcels may be network connected and may be configured to generate, receive, and/or transmit data to one or more additional computing devices to initialize transactions, to memorialize transactions, and/or the like. Information/data generated/received/transmitted by the IoT physical asset may be recorded via a distributed ledger, as discussed herein. Accordingly, the transaction computing entity 110 may be the IoT enabled physical asset, such as a parcel 102.

Moreover, in certain embodiments transaction computing devices may be embodied as autonomous vehicles (e.g., autonomous aerial vehicles, autonomous ground-based vehicles, and/or the like), partially autonomous vehicles, computing devices secured within vehicles, and/or the like).

Exemplary Physical Asset

In various embodiments, the physical asset can be any physical item. In certain aspects, the physical asset can be IoT enabled. For instance, the physical asset could be "smart" as it may interface with one or more wireless networks. For example, a physical asset may include one or more components and/or features of the computing node 100 and/or computing device 110. In certain embodiments, the physical asset can be transferred from one entity to another. As used herein, the term entity can be referenced as a person, machine, and/or location.

In an exemplary aspect, the physical asset may be transferred between one or more entities in a transportation network, such as a network of courier service providers. Accordingly, the physical asset may relate to a parcel that may comprise one or more wireless network interface devices to provide a "smart" parcel, such as the shipments/items described in co-pending U.S. patent application Ser. No. 15/623,989, filed Jun. 15, 2017, the contents of which are incorporated herein by reference in their entirety.

A parcel 102 may be any tangible and/or physical object configured for containing/enclosing an item. Such parcels 102 may be picked up and/or delivered by a carrier/transporter, for example, via one or more carrier service levels, such as Same Day Air, Same Day Ground, Next Day Air, Next Day Ground, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. In one embodiment, a parcel may comprise one or more packages, bags, containers, loads, crates, items banded together, vehicle parts, pallets, drums, the like, and/or similar words used herein interchangeably. The parcel may enclose an item (e.g., a shipped item) that itself may be tracked separately and/or in parallel with the parcel. Such parcels 102 may include the ability to communicate (e.g., via a chip (e.g., an integrated circuit chip), RFID, NFC, Bluetooth, Wi-Fi, and any other suitable communication techniques, standards, or protocols) with one another and/or communicate with various computing devices for a variety of purposes. For example, the parcel 102 may be configured to communicate with one or more devices (e.g., computing devices) located at one or more locations (e.g., a shipper location, a carrier location, and/or a recipient/consignee location) using a short/long range communication technology, as described in co-pending U.S. patent application Ser. No. 15/348,189, filed on Nov. 11, 2016 and incorporated herein by reference in its entirety. Further, such parcels 102 may have the capabilities and components of the described with regard to the computing nodes 100, networks 105, vehicles, transaction computing devices 110, and/or the like. For example, the parcel 102 may be configured to store item information/data. In example embodiments, the parcel information/data may comprise one or more of a consignee name/identifier, a shipment identifier, a service point (e.g., delivery location/address, pick-up location/address), instructions for delivering the parcel, a parcel delivery authorization code, information/data regarding if a device is present at the service point (e.g., a recipient location), and/or the like. In this regard, in some example embodiments, a parcel may communicate send "to" address information/data, received "from" address information/data, unique identifier codes, and/or various other information/data.

In some embodiments, each parcel may include a unique shipment identifier, such as an alphanumeric identifier. Such shipment identifiers may be represented as text, barcodes, tags, character strings, Aztec Codes, MaxiCodes, Data Matrices, Quick Response (QR) Codes, electronic representations, and/or the like. A unique shipment identifier (e.g., 123456789) may be used by the carrier to identify and track the parcel as it moves through the carrier's transportation network. Further, such parcel identifiers can be affixed to parcels by, for example, using a sticker (e.g., label) with the unique parcel identifier printed thereon (in human and/or machine readable form), an RFID tag with the unique parcel identifier stored therein, and/or other onboard computing devices operating as IoT enabled modules provided on the parcel. In some aspects, the parcel identifiers can be wireless emitted by the IoT enabled module, or in some instances, generated for display by the IoT enabled module for presentation on a display device in communicated therewith.

In various embodiments, packaging materials (e.g., boxes, envelopes, padded envelopes, sleeves, and/or the like) utilized for the parcel may incorporate the one or more electrical components, including a power supply, therein. The power supply may be embodied as a battery, such as a lithium battery, that may be incorporated into the packaging materials. In certain embodiments, the battery may be printed onto the packaging materials (e.g., as a portion of a printed label). In various embodiments, the one or more electrical components may be configured to automatically activate upon sealing the packaging materials. For example, the packaging materials may comprise one or more electronic contacts (e.g., conductors) embedded, printed, and/or the like in one or more portions of the packaging materials, such that the electronic contacts collectively form a complete, closed circuit with one or more onboard computing components (e.g., batteries, processors, memory storage areas, wireless receivers (e.g., RFID receivers, BLE receivers, Wi-Fi receivers, and/or the like), wireless transmitters (e.g., RFID transmitters (active or passive), BLE transmitters, Wi-Fi transmitters, and/or the like), and/or the like). In certain embodiments, the electronic contacts may comprise printed conductors (e.g., 3-D printed conductors, inkjet printed conductors, and/or the like), such as conductive inks, sintered conductive materials, semi-conductive materials, and/or the like. When the packaging materials are closed, the electronic contacts enable current to flow between the onboard battery and the onboard computing components such that the onboard computing components are active (e.g., able to transmit and/or receive information/data).

Moreover, in certain embodiments the parcel may comprise one or more environmental sensors configured to detect a condition of the parcel and/or the environment of the parcel. For example, the parcel may comprise temperature sensors, humidity sensors, accelerometers (to detect impacts and/or drops), and/or the like. As discussed herein, the one or more sensors within the parcel may be utilized to determine whether the parcel conditions remained consistent with applicable shipping rules, thereby enabling the use of condition-based smart contracts as discussed herein.

In certain embodiments, items contained within a parcel may be wirelessly connected, and may be configured to provide wireless connectivity functionality for the parcel while the parcel is being transported by a carrier. For example, an electronic device being shipped may comprise a wireless transmitter (e.g., an RFID tag), a power supply, an on-board memory, and/or the like that may be configured to broadcast parcel information/data while the item remains packaged within the parcel. In certain embodiments, the wireless connectivity components may be disconnected and/or deactivated once the item is removed from the parcel. For example, the wireless connectivity components may be embodied as a separate object placed within the parcel (e.g., secured relative to the packaged item); the wireless connectivity components may be embedded within the item; the wireless connectivity components may form a functional part of the item, and the shipment-specific functionality may be deactivated upon removal from the parcel, and/or the like.

In various embodiments, parcels may be associated with parcel information/data comprising information/data specific to the particular parcel. The parcel information/data may comprise information/data regarding an intended shipping route for the parcel (e.g., an origin, destination, and/or the like), information/data regarding the contents of the parcel (e.g., identifying one or more items stored within the parcel), information/data identifying shipping requirements for the parcel (e.g., a carrier service level, temperature requirements, humidity requirements, shock requirements, and/or the like). As discussed herein, the shipping requirements for a parcel may be utilized to automatically apply various smart contracts upon determining whether shipping requirements have been met. Moreover, the parcel information/data may comprise updated control identifiers and/or addresses, as discussed herein, providing information/data indicative of a current identity of an entity, individual, and/or location in control (e.g., possession) of the parcel. For example, the control identifier and/or digital address may indicate that a particular parcel is located on a particular delivery vehicle, at a particular carrier sort location, at a pick-up/transfer/delivery location, and/or the like. Moreover, the parcel information/data may comprise linking information data configured for use in a distributed ledger/blockchain environment, to link the parcel information/data of a particular transaction or "block" to previously generated transaction/blocks relating to the same and/or different parcel information/data.

Exemplary Distributed Ledger System (e.g., Blockchain)

In certain embodiments, a distributed ledger system may store information/data indicative of various transactions occurring between multiple computing devices (e.g., multiple transaction computing devices). The distributed ledger system may be embodied as a blockchain ledger system, comprising a plurality of "blocks" each representing one or more discrete transaction(s) occurring between computing devices. Each block may comprise information/data linking to a previous generated block, thereby providing a complete chain between the generation of information/data stored in the distributed ledger and the later use of the same information/data (e.g., to establish a complete chain-of-possession of information/data). The information/data stored in the various transactions/blocks may be encrypted/hashed/or otherwise protected from unauthorized access (e.g., read access, write access, and/or delete access). In a non-limiting example, information stored in the various blocks may be irreversibly hashed, such that the hashed information/data may be used to verify the authenticity of transactions, but the hashed data may not be reverse-engineered to ascertain substantive information based on the hashed information alone. Moreover, information/data transmitted between various computing devices may be encrypted (e.g., using public/private key pairs to digitally sign and/or verify data) such that blocks/transactions stored within the block chain may be verified by multiple computing nodes 100 having access to the public and/or private keys. Upon verification of the information/data to be stored in the blockchain, the information/data may be hashed and stored as noted herein.

The distributed ledger system may comprise one or more, Bitcoin-based blockchains, Ethereum-based blockchains, Hyperledger blockchains, Quorum, Corda and/or the like. The distributed ledger system may incorporate a single distributed ledger/blockchain configured for storing all transactions therein, or the distributed ledger system may comprise a plurality of distributed ledgers/blockchains, wherein each distributed ledger/blockchain is utilized to store information/data indicative of a particular type of transaction. For example, a first distributed ledger/blockchain may be configured to store parcel shipping/tracking information/data, and a second distributed ledger/blockchain may be configured to store value transfer information/data (e.g., via a virtual currency). Accordingly, various embodiments may comprise and/or utilize digital currency/ assets represented by ledger entries. Such digital currency/ assets (e.g., Bitcoin, Ether, and/or the like) may itself have value that may be exchanged for various items, services, and/or the like. Such digital currency/assets thus may be utilized as a currency in various transactions. Moreover, various embodiments may utilize and/or comprise various digital assets and/or coins that may be exchanged for items and/or information/data having a defined value.

The distributed ledger may be stored in and/or by one or more computing nodes of the distributed ledger system in complete or partial form. For example, it may be stored on a stationary computing device, a mobile computing device and/or an IoT enabled device (e.g., a package and/or container in the supply chain). It is contemplated that any computing device or computing node in accordance with FIG. 2 or 3 can operate as a node if it maintains a copy of the distributed ledger and is in communication with at least one peer node of the distributed ledger system. For example, each computing node may store a complete copy of the one or more distributed ledgers/blockchains, and may be utilized for backup protection, validation of transactions/blocks, execution of smart contracts, and/or transaction verification purposes, among other things. The distributed ledger system may be publicly accessible, and may be distributed among a plurality of commercial computing devices (e.g., servers), user computing devices (e.g., desktop computers, laptop computers, and/or the like), and/or the like. However, in certain embodiments, the distributed ledger system may be privately accessible (e.g., permissioned), and may be stored by one or more computing nodes controlled by a single entity or a consortium of trusted entities (e.g., participating courier service providers in a courier service provider network). In the latter embodiments, access to information/data stored in the distributed ledger may be limited to users having defined credentials (e.g., a private key, a passcode, and/or the like). In certain embodiments, information/data stored in the distributed ledger system may be hashed, encrypted, or otherwise protected from unauthorized access (e.g., read access and/or write access). The substantive information/data stored in the distributed ledger system may be accessible utilizing a private key to decrypt the stored information/data, or the substantive information/data may be inaccessible based on information/data stored in the distributed ledger.

In various embodiments, each transaction/block in the distributed ledger may comprise asset-identifying information (e.g., coin/token information, parcel information/data, information/data of transacting entities), and may represent a shipping/tracking event for the corresponding parcel. In one embodiment, the shipping/tracking event may represent a transfer of an asset (physical and/or digital) from one entity to another. For example, each time a parcel is scanned within a carrier's transportation network, when a parcel is ingested into the carrier's transportation network, each time the parcel is transferred from one shipping entity to another shipping entity, each time the parcel is transferred from one shipping entity to a non-shipping entity, and/or the like, the distributed ledger system may be configured to generate a new transaction/block providing information/data indicative of the transaction. In another embodiment, the shipping/ tracking event may represent physical events/conditions occurring during the transportation of the physical asset. For instance, the shipping/tracking event may be a physical condition captured by the one or more sensors associated the parcel (e.g., a sensor attached to the parcel itself and/or in the vicinity of the parcel, such as a sensor associated with the transportation vehicle). The physical event/condition may relate to environmental conditions (temperature, pressure, humidity, and the like) of the parcel itself and/or an environment of the parcel, such as a transportation vehicle and/or a storage facility. Additionally, the physical event/condition may relate to incidentals that may affect and/or damage the physical asset (or any contents thereof). In one aspect, the physical event/condition may be an accelerated movement of the physical asset that is detected by one or more sensors. For example, the accelerated movement could be a result of a sudden impact that may occur when the parcel is mishandled (e.g., dropped) or inappropriately stored such that surrounding objects may fall onto the parcel or when the parcel falls off a storage rack. Any and all combinations are within the scope of this disclosure.

In certain embodiments, each transaction/block may comprise at least a portion of the parcel information/data of a prior transaction/block, thereby providing a link back to the prior transaction/block representing a transaction involving the same and/or different parcel information/data. In one aspect, each new transaction/block may comprise parcel information/data, where the new transaction/block is linked to a prior transaction block based on hashing the combination of information/data associated with new transaction/ block and the information associated with the one or more prior transactions/blocks. Similarly, the prior transaction/ block may comprise a link to an even earlier transaction/ block(s), and the chain of transactions/blocks can lead back to the originating or genesis transaction relating to the parcel.

In general, a new transaction block may be added by capturing information associated with the transfer of a physical asset (e.g., a pick-up, hand-off, or shipping/tracking event associated with the physical asset), a digital asset (e.g., transferring a token/coin between digital addresses), and/or a combination thereof. The new transaction block may be added based on hashing, via a hashing algorithm, the information from one or more transactions/blocks and/or the newly added block. The hashing algorithm may be any suitable hashing algorithm that takes an input of any length and generates an output of a fixed length. For instance, the hashing algorithm may be a Pay-to-Script Hash (P2SH) algorithm, a Scrypt algorithm, a RIPEMD algorithm, a Secure Hash Algorithm (SHA), and/or the like. In embodiments, the hashing algorithm may be a SHA-256 algorithm. In certain embodiments, the hashing algorithm may be an MD5 algorithm. This may provide an immutable link between each transaction/block.

In various embodiments, a new transaction/block in a distributed ledger may be linked to a transaction/block of one or more secondary distributed ledgers. The secondary distributed ledger may be one or more side chains and/or one or more distributed ledgers. The secondary distributed ledger may be a public, private, and/or consortium distributed ledger as described in more detail below. In addition, the one or more side chains can memorialize or capture other information/transactions that is not captured by a primary distributed ledger. As such, the one or more side chains may run in parallel to other distributed ledgers but still be linked to transaction/blocks in a primary distributed ledger. In this way, each side chain may be a distributed ledger dedicated to capturing information that is not otherwise captured by the primary distributed ledges. By way of example only, the one or more secondary chains may capture information and/or transactions associated with services relevant to the physical asset (e.g., insurance coverage) and/or information relevant to the physical asset (e.g., information associated with delivery vehicle, environmental conditions, pick-up drop-off location, and route information).

Exemplary System Operation

In various embodiments, a distributed ledger system may be provided for maintaining chain-of-possession information regarding one or more physical assets (e.g., a parcel and/or one or more items within said parcel). As discussed herein, the distributed ledger system may be configured to store verifiable (e.g., single or multi-point verified) transaction information/data reflecting changes in physical possession of various parcels and/or items as the parcels and/or items are transported from an origin to a destination. In some embodiments, the distributed ledger may be a private ledger, public ledger, and/or a consortium distributed ledger. In other words, various embodiments can have predetermined nodes that are eligible for maintaining the distributed ledger.

For instance, the distributed ledger system may be a private distributed ledger that is maintained by designated nodes selected by a specific entity (e.g., a specific carrier). In one aspect, the distributed ledger system may be associated with a consortium, where the dedicated nodes for maintaining the ledger are selected by the consortium. In one non-limiting example, the distributed ledger may be maintained by an agreed upon group of a group of nodes provided by a plurality of entities (e.g., a group of carriers). In another aspect, the distributed ledger may be a publicly distributed ledger, where any node can participate in maintaining the distributed ledger. Any and all aspects and combinations thereof are within the scope of this disclosure. For example, as discussed above, blocks in a first distributed ledger may be linked to blocks in a secondary distributed ledger, where the first distributed ledger may be a public distributed ledger and the secondary distributed ledger may be a private distributed ledger. As such, in one embodiment, a transaction/block associated with the primary distributed ledger may be linked to a block associated with the secondary distributed ledger.

In various embodiments, the distributed ledger may be carrier-dependent, where the transactions/blocks reflects changes of possession involving carrier personnel only. In another embodiment, the distributed ledger system may carrier-independent, where the ledger reflects changes of possession of the parcel between a plurality of entities, including different carrier organizations, machines, and individuals. As such, in one embodiment, information associated with the transfer of an asset (such as change of possession information) may be stored as a transaction/block on the distributed ledger(s) regardless of the entities involved in the transaction. As discussed below, the physical location associated with the transfer of an asset may also be stored as and/or in a transaction/block on the distributed ledger.

Moreover, as discussed herein, the distributed ledger system may be configured to automatically transfer value (e.g., in the form of a digital currency existing within and/or associated with the distributed ledger system) upon the occurrence of various trigger events. These transfers of value may be performed in accordance with smart contracts (e.g., programmed scripts) stored within the distributed ledger maintained by a distributed ledger system in accordance with the present disclosure. In general, a smart contract refers a computer protocol that executes defined terms of a contract. The smart contract may be integrated into one or more distributed ledger systems and/or one or more databases. In one aspect, the distributed ledger system may provide varying degrees of Turing-complete script language to program a smart contract. In various embodiments, the smart contract can be maintained by each computing node, a Decentralized Autonomous Organization (also known as a Decentralized Autonomous Corporation), or alternatively, the smart contract may be implemented in one or more secondary distributed ledger systems that referenced/linked in a primary distributed ledger system. In certain aspects, a node may execute and/or subsequently verify the smart contract associated with a transaction based on the transfer request, one or more parameters, and/or triggering events, as discussed below in more detail.

Recording Transactions to Reflect Changes-of-Possession of an Asset

In various embodiments, transactions may be recorded by changing an associated entity identifier corresponding to a particular digital asset (e.g., a coin/token), a physical asset (e.g., identification information/data associated with a parcel), and/or a combination thereof. As noted above, in a distributed ledger system, a plurality of "transaction/blocks" may be generated and utilized to store information/data corresponding to a particular physical/digital assets (e.g., parcels, tokens, and/or items) to be tracked by the system. In such embodiments, each transaction/block may comprise a control identifier and/or digital address. Each transaction/block may thus indicate an entity, individual, and/or location in possession of the physical asset and/or digital asset, among other things (e.g., timestamp of transfer, prior possessor, location of transfer). For example, each transaction/block may comprise at least a portion of information/data corresponding to a particular asset (e.g., parcel, coin/token, and/or item), and may comprise a control identifier (e.g., a digital address and/or a location-based digital address) indicative of an entity, individual, and/or location having possession of the parcel, token, and/or item. Each individual transaction/block may be traceable to previously generated transactions/blocks, each of the previously generated transactions/blocks comprising corresponding control identifiers indicative of previous entities, individuals, and/or locations having possession of the parcel and/or item. Accordingly, a complete chain of control may be identified for each parcel, token, and/or item by identifying transactions/blocks within the distributed ledger corresponding to the parcel, token, and/or item.

In certain embodiments, a new transaction/block may be generated and/or added to the blockchain each time control/possession/ownership of a parcel, token, and/or item changes, each time a triggering event occurs, each time a shipping event occurs, and the like. For example, if a parcel is moved from one location to another, handed off from one individual to another individual at a corresponding location, handed off from one individual to a machine, handed off from one machine to a facility location, handed off from one machine to a machine, and/or any combination of the foregoing, a new transaction/block may be generated to identify the current control and/or physical location of the parcel and/or item. As a further example, each time a coin/token representative of an asset (e.g., parcel) is generated and/or transferred from one digital address to another digital address, a new transaction/block may be generated to identify the current entity in physical possession of the coin/token and/or the physical location of where the coin/token was transferred. As the coin/token is uniquely tied to the physical asset (e.g., a package) being transferred between entities, the coin/token may be transferred along to digitally represent the physical transfer of the asset.

As discussed herein, each physical asset (e.g., parcel) may include modules that wirelessly transmit corresponding data (e.g., control identifier, digital address, blockchain digital-physical address, and/or token information), and therefore control of the physical asset may be self-monitored and/or autonomously self-directed, by monitoring wireless connectivity between the parcel and one or more transaction computing devices located proximate the parcel. As yet another example, one or more transaction computing devices may be configured to monitor control of an asset (e.g., parcel, token, and/or item) and to provide updated control information/data to the computing nodes to update the distributed ledger. For example, the transaction computing devices may be configured to transmit wireless signals between various transaction computing devices to signify a change in control of the asset (physical and/or digital). The transaction computing devices may be further configured to transmit information/data to various computing nodes to record the change in control in the distributed ledger system, by generating a new block to be stored in the distributed ledger/blockchain indicative of at least a portion of the information/data associated with the asset as well as the control information/data.

Synchronizing Digital Transactions with Physical Locations

In various embodiments, a plurality of transaction computing devices may collectively verify digital and/or physical transactions involving one or more assets (physical and/or digital). For example, at least two transaction computing devices (e.g., handheld computing devices, IoT enabled parcels, autonomous vehicles, vehicle computing devices, a storage location, and/or the like) may be necessary to memorialize a transaction. A first transaction computing entity can be associated with the entity providing the asset, and a second transaction computing entity associated with the entity receiving the asset. Thus, in certain embodiments, the computing node may utilize information/data received from a plurality of transaction computing devices to verify the occurrence of a transaction. As one non-limiting example, the computing node may utilize transaction verification methodologies as discussed in co-pending U.S. patent application Ser. No. 14/942,034, the contents of which are incorporated herein by reference in their entirety.

To verify the occurrence of a transaction, the first transaction computing entity may provide information/data to a computing node indicating that a physical asset (e.g., a parcel) and/or a digital asset (e.g., a coin/token) is being transferred to a new control entity. In certain embodiments, the first transaction computing entity may provide information/data indicating the identity of the receiving transaction computing entity. Moreover, the second transaction computing entity may also provide information/data to a computing node indicating that the asset is being transferred. The second transaction computing entity may provide information/data indicating the identity of the providing transaction computing entity, such that the providing and receiving computing devices may be verified based on the information received from both the first and second computing entity. In certain embodiments, the physical asset (e.g., a wirelessly connected parcel) may further provide information/data to the computing node indicative of the transfer of control from a first transaction computing entity to a second transaction computing entity. In such embodiments, the computing node may verify the occurrence of a transaction transferring control of the parcel from the first transaction computing entity to the second transaction computing entity based on the information received from the first transaction computing entity, the second transaction computing entity, and/or the parcel, parcel label, item, item label or information provided by human operators of such computing devices (e.g., digital signatures, private/public key pairs, and/or the like). Upon confirming the information/data received from each computing entity provides a consistent and/or identical record of the transaction, the computing node may be configured to generate a new transaction/block to be stored in the distributed ledger indicative of the transaction. Upon determining that the information/data received from each of the computing devices is inconsistent (e.g., the identity of transaction computing devices involved, the time of transaction occurrence, characteristics of the item during the transaction (e.g., package characteristics such as size, weight, condition, environmental consideration, material type, and/or the like), and/or the like), the computing node may be configured to request additional verification information (e.g., a confirmation request, a passcode, a private key, a biometric authorization) from some or all of the one or more computing devices (and/or additional computing devices) prior to storing information/data regarding the transaction in the distributed ledger. In certain embodiments, the distributed ledger may use verified and/or verifiable transaction information/data when enforcing smart contracts as discussed herein.

In one embodiment, transfer of a digital asset can be performed using one or more digital addresses. The digital address is a digital representation and/or account that can be associated with a digital asset. In some embodiments, the digital address may be designated by and/or associated with a distributed ledger. In various embodiments, validation of a transfer of a digital asset (e.g., token and/or coin) is facilitated utilizing features of asymmetric key cryptography (i.e., public-private key pairs), among other things. In some aspects, as is commonly known in public Blockchains (e.g., Bitcoin), a private key can be employed to generate one or more associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital signature generated by an associated private key. As public keys can be shared freely, public keys generally function as "wallet addresses" that are associated with a private key. In this regard, digital assets or other units of value (e.g., Bitcoin) can be "transmitted" from one wallet address (e.g., a public key of a sender) to another wallet address (e.g., a public key of a receiver). In actuality, however, the transmission of a digital asset or unit of value is not a physical transfer, but is represented as a record of transfer from one wallet address to another that, if validated, is recorded onto the blockchain. The record is not finalized (i.e., added to the Blockchain), however, until the transfer is validated by a consensus of nodes.

The digital address (and/or the temporary, location-based digital address) may be associated with an entity that is participating in a transaction, such as one or more transacting entities (e.g., a transferor and a transferee). More specifically, the digital address may be associated/accessed with a computing device that is being used in the transaction. In some embodiments, the digital address is associated with one or more public/private keys. In accordance with certain embodiments described herein, the digital address may be a blockchain address that is hashed from the public key. In some embodiments, the digital address is associated with a public-private key pair that is associated with a particular entity (e.g., a courier, pallet, vehicle, loading dock, and the like, for a courier services provider). The public/private keys can, among other things, facilitate digital verification or authentication of transfers, and also the encryption and decryption of transfer requests between the digital addresses, as one of ordinary skill may appreciate. For example, the transfer request (e.g., a transferor request and/a transferee request) may be digitally signed with a private key to authenticate that the transfer of a digital asset was requested by an entity that is associated with a public address derived from the private key.

In various embodiments, a transferor may request to transfer a digital asset (e.g., a token/coin) from a first address (e.g., a public address of a private-public key pair) associated/accessible with a first computing device to a second address (e.g., another public address of another private-public key pair) associated/accessible with a second computing device. The first and second computing device may be referred to herein as a sender device and a recipient device, respectively. For example, a first entity (e.g., an entity in physical possession of a parcel) associated with the first address may request, via the first computing device, to transfer an asset (e.g., a digital asset, such as a coin/token). The request may be digitally signed using a private key associated with the first address and/or first computing device. The digitally signed transfer request can then be authenticated, via the second computing device and/or a computing node, using a public key associated with the first address to verify that the transfer request is a legitimate request from the first entity. In this regard, the second computing device and/or node can verify, via the distributed ledger, that the first computing device is the rightful possessor of the digital asset. It is contemplated that, in some embodiments, each of the transacting entities, either individually or as a combination, can request and/or confirm the transfer of the asset from a first address to a second address.

In certain embodiments, the transfer of the digital asset may correspond to the transfer of a physical asset (such as a parcel). For instance, a digital asset (e.g., a token/coin) may be linked to a unique identifier associated with a physical asset (e.g., a parcel). In some aspects, the digital asset (e.g., token/coin) can be the unique identifier, a hash of the unique identifier, or a combination of at least some portions thereof. In one aspect, the association between the digital asset and the physical asset may be stored on one or more storage databases and/or distributed ledgers. Additionally or alternatively, as discussed below, the digital asset may be linked to the physical asset by generating a unique token based on, at least in part, the unique identifier. For example, an entity may create a shipment request to transport a physical asset. A digital asset may then be created and sent to the entity's digital address. In general, the digital asset can be linked to the physical asset. In other words, the digital asset can be thought of a digital representation (e.g., "digital twin") of the physical asset. Accordingly, in some embodiments, the transfer of the digital asset may be representative of the transfer of the physical asset.

In some embodiments, the request to transfer the asset may be initiated via the transferor computing device and/or the transferee device. For example, the transferor computing device may communicate a request to transfer the asset to a remote computing device (e.g., computing node 100 and/or computing device 110). Similarly, the transferee computing device may communicate a request to transfer the asset to a remote computing device (e.g., computing node 100 and/or computing device 110). Based on the transferee's request, the transferor's request, and/or the combination thereof, the transaction may be verified and executed, as described in more detail below.

In various embodiments, the unique identifier may be captured by one or more transacting computing devices and be submitted with a request to transfer the digital asset. This may provide independent verification that the physical asset is physically located near the transfer of the digital asset. In one aspect, the unique identifier can be detectable by one or more computing devices. For instance, the unique identifier may be a machine readable indicia associated with a label of the physical asset that is capable of being captured by one or more computing devices. Additionally or alternatively, the physical asset may be IoT enabled such that it wirelessly communicates the unique identifier to other computing devices. It should be appreciated that the transfer of the digital asset may be before, during, and/or after the transfer the physical asset. In certain embodiments, the transfer of digital and/or physical asset can occur within a specified time frame (e.g., second, minutes, hours, and/or days). For instance, the one or more of the transacting entities can capture the unique identifier and/or request the transfer of the digital asset within the specified time frame. In one aspect, the unique identifier can be submitted in combination with the transfer of the digital asset.

In general, transfer of the digital asset and/or physical asset can be captured within a new transaction/block on one or more distributed ledgers. In addition, the new transaction/block may also include a hashed output that is hashed based on information stored in one or more previous transaction/blocks of the one or more distributed ledgers. It is also within the scope of this disclosure that the transfer of the asset (digital and/or physical) may be combined with other transactions into a single transaction/block using a hashed-based data structure (e.g., a Merkle tree). In addition, the transaction/block may be added to one or more distributed ledger by one or more nodes. As is known in the art, in various embodiments, the single transaction/block may be added by one or nodes based on achieving a consensus among the one or more nodes as to which transaction/block is valid and, thus, added to the distributed ledger. For example, the consensus can be based on a consensus algorithm, such as a Proof-of-Work (PoW), a Proof-of-Stake (PoS), a Delegated Proof-of-Stake (DPoS), Byzantine Fault Tolerance (BFT), a Directed Acyclic graph (DAG), and the like. In various embodiments, once a node determines that a transaction/block can be added to the distributed ledger, it can communicate the transaction/block to at least one neighboring node of the distributed ledger network. Accordingly, a plurality of nodes may verify that the transaction/block can be added to the distributed ledger. In one embodiment, one or more confirmations may be transmitted to the first and/or second entity that verifies the transaction has captured or memorialized in a transaction/block on one or more distributed ledgers. As discussed in more detail below, the transfer of a digital asset and/or physical asset may not be memorialized in a transaction/block on the distributed ledger until one or more triggering events occur and/or when one parameters are verified.

As mentioned, a digital asset can be transferred from a first address to a second address (also referred to as a "digital address"). In various embodiments, the one or more addresses may be a temporary digital address. The temporary digital address can be generated based on data/information associated with information/data from one or more computing devices. In one non-limiting example, the temporary digital address may be generated based in part on a location parameter of the one or more computing devices. For instance, the temporary digital address may be generated based at least in part on a location parameter (e.g., a set of GPS coordinates, a set of wireless signal identifiers, or a set of radio tower identifiers) of the one or more computing device's current location. The location parameter may then be used to generate a temporary private and/or public key pair that is used to create a temporary, location-based digital address. In further embodiments, the digital asset can be transferred from a first address to a second address based on the execution of a smart contract. For instance, the digital asset may not be transferred unless the location parameter of one or more computing device is submitted and/or validated.

In embodiments, the location parameter one or more computing devices may be associated with the transferor, the transferee, or a combination thereof. In addition, the one or more computing devices may be physically proximate the transaction but may not itself be a transacting computing device. For example, the computing device may be a smart watch, a computing device integrated into a delivery vehicle, and/or any other nearby computing devices. In embodiments, there may be multi-point verification of the location parameters, such as that described in co-pending U.S. patent application Ser. No. 15/623,989, filed Jun. 15, 2017, the contents of which are incorporated herein by reference in their entirety. Verifying the location parameters of a transacting computing based on location parameters of nearby computing devices other than the transacting computing device(s) may further ensure that none of the transacting computing devices are "spoofing" (e.g., falsifying) its location parameters.

As discussed, a digital asset can be transferred between one or more digital addresses and one or more temporary, digital address corresponding to a physical location. As mentioned, each digital address may be associated with unique private and public keys. In various embodiments, a random number generator can generate the private key. The random number generator may be a cryptographically secure, pseudo-random number generator that outputs a private key. The private key may then be input for a one-way cryptographic function. In various embodiments, the one-way cryptographic function is an elliptic curve multiplication. Utilizing the private key as input, the one-way cryptographic function can output a public key. The private and public key may then be used to encrypt/decrypt and/or sign/authorize a transfer request. In one embodiment, the public key can be hashed with a hashing algorithm, such as a RIPEMD hashing algorithm, a Secure Hash Algorithm (SHA), and/or the like. Additionally and/or alternatively, the hashing algorithm can hash the public key utilizing the location parameter of one or more computing devices to generate a digital address (e.g., a blockchain digital-physical address). For example, the digital address can be hashed by "salting" the hashing algorithm with the location parameter of one or more computing devices. As is known in the art, the term salting may refer to using two or more inputs in a cryptographic hashing function to create single hashed output. As such, in some embodiments, both a digital address and a location parameter may be used as input for a cryptographic hashing function. These inputs can then be hashed by the hashing algorithm to create one hashed output (e.g., a temporary digital address). The digital address can then be used on temporary basis during the transfer of a digital asset to associate digital transaction with a physical location.

In various embodiments, the location parameters determined by a computing device (e.g., the transferor computing device, the transferee computing device, or a combination thereof) can be associated with the transfer request. In certain aspects, a temporary, location-based digital address (e.g., a blockchain digital-physical address) may be utilized to associate the location parameter with the transfer request. The temporary digital address may thus be linked to a physical location such that one or more nodes may verify the location parameters associated with the asset transfer. Accordingly, the digital transfer of an asset to/from the temporary digital address can be linked to a physical location. In certain embodiments, one or more computing devices can subsequently determine a physical location from the temporary digital address, thereby confirming that the digital transaction took place at a particular physical location. In various embodiments, the transfer between one or more temporary addresses and/or digital addresses must occur within designated time limit to facilitate the transfer of the digital asset. Additionally or alternatively, as discussed in greater detail below, a smart contract may be used to verify the physical location of the digital transfer.

Figure 4:
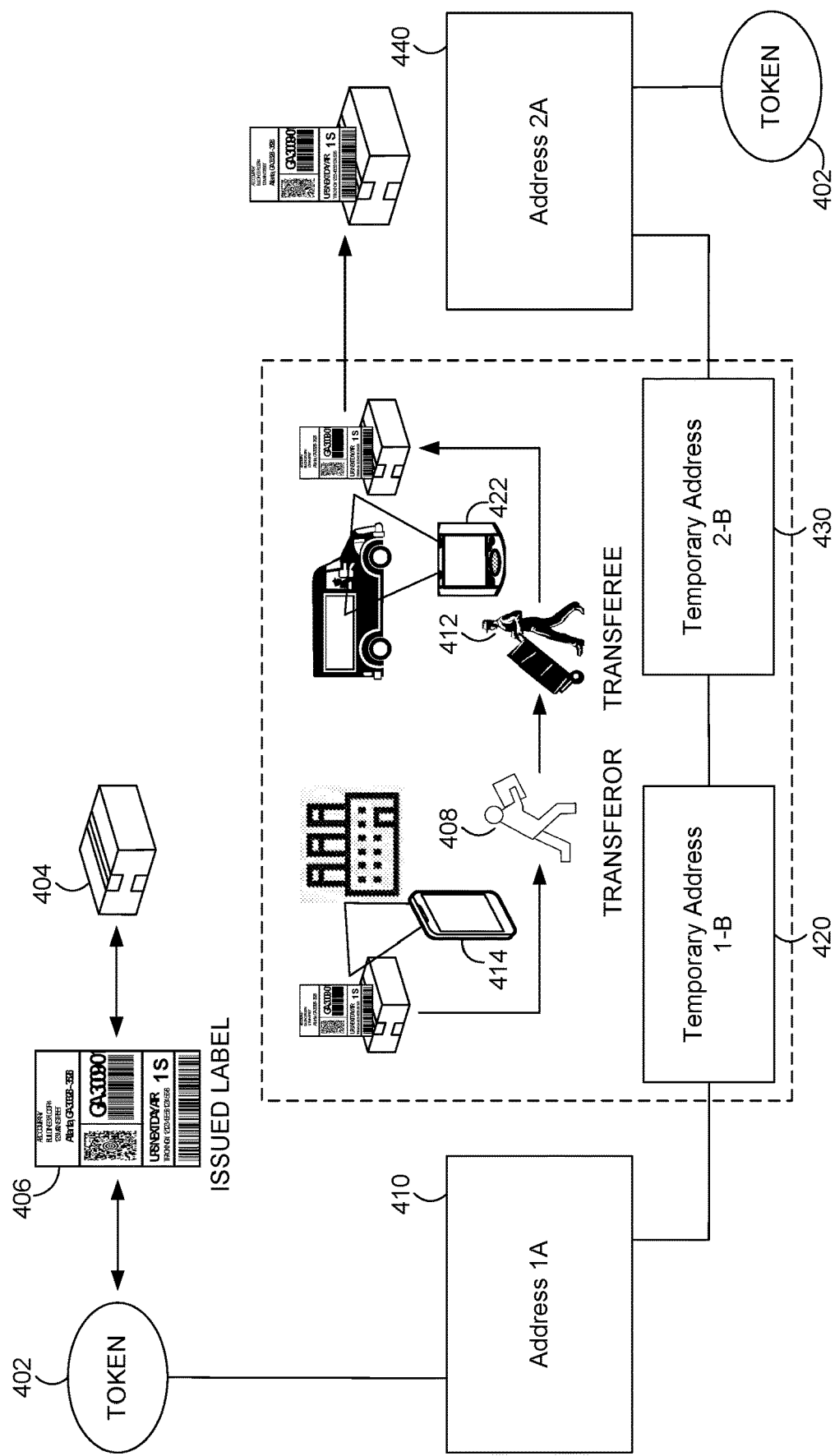
FIG. 4 illustrates synchronization of digital transactions with verifiable physical locations in accordance with certain embodiments of the present disclosure.

Referring to now to FIG. 4, it illustrates synchronizing digital transactions with physical locations according to aspects of the disclosure. As mentioned, the token/coin 402 can be linked to a physical asset 404. In one aspect, the token/coin 402 can be linked to a unique identifier that is associated with the physical asset 404. In another aspect, the token/coin 402 is itself the unique identifier. In general, the token/coin 402 can be thought of a digital representation (e.g., a "digital twin") of the physical asset. In one embodiment, the unique identifier can be integrated with and/or physically associated with the physical asset 404. As shown, the unique identifier may be associated with the physical asset 404 via a label 406 comprising a machine readable indicia that is associated with the unique identifier. Additionally or alternatively, the physical asset 404 may be IoT enabled physical asset. For instance, a wireless transmitter may be associated with the physical asset 404, where the wireless transmitter communicates the unique identifier to a wireless receiver in one or more nearby computing devices. Any and all aspects of associating the unique identifier with the physical asset 404 is within the scope of this disclosure.

In various embodiments, the token/coin 402 and label 406 can be provided to the transferor. For example, the token/coin 402 can be transferred to a first address 410 that is associated with the transferor 408. The first address 410 can thus "store" the token/coin. In addition, the token/coin 402 can be transferred from the first address 410 utilizing a private/public key pair. For instance, a transferor may digitally sign the transfer request, transferring the token/coin 402 to another address. As mentioned above, in some embodiments, the token/coin 402 may be associated with a unique identifier that is associated with the physical asset 404. For instance, the unique identifier may be attached or otherwise linked to the asset 404 via the label 406.

With continued reference to FIG. 4, the transferor 408 may transfer the token/coin 402, the physical asset 404, or a combination thereof to a transferee 412. The terms transferor 408 and/or transferee 412 are meant to be interpreted broadly as they may refer to any type of entity (machine, device, person, etc.), or even a location-based device (e.g., a lock box), that is participating in the transfer of the token/coin 402, the physical asset 404, or a combination thereof.

In one embodiment, the transferor 408 and/or transferee 412 requests to transfer the token/coin 402. At any point, one or more temporary digital addresses (e.g., a blockchain digital address) can be generated based on data/information (e.g., location parameters) from one or more computing devices. Any number of temporary digital addresses may be generated. In one non-limiting example, a single temporary digital address is generated. In one embodiment, the temporary digital address is then shared (along with the ability to access the temporary digital address) with the one or more transacting computing devices. The temporary digital address can be used to facilitate the transfer of a digital asset from a first digital address to a second digital address. In other words, the temporary digital address can act as an intermediate digital address to facilitate the transfer of the digital asset from the first digital address to a second digital address. In one embodiment, a single temporary digital address may be generated based on a location parameter of one or more computing devices proximate the physical location of the transfer of the asset. The one or more computing devices may be associated with the transferor 408, the transferee 412, or a combination thereof. In addition, the one or more computing devices may be physically proximate the transaction but may not itself be a transacting computing device. For example, physically proximate computing device may be a smartwatch, a delivery vehicle, and/or any other nearby computing devices, including but not limited to radio towers, WiFi routers, GPS satellites, and Bluetooth beacons, among other things. In embodiments, relying on location parameters from computing devices other than the transacting computing device(s) may further ensure that none of the transacting computing devices are "spoofing" (e.g., falsifying) its location parameters. In embodiments, there may be multi-point verification of the location parameters, such as that described in co-pending U.S. patent application Ser. No. 15/623,989, filed Jun. 15, 2017, the contents of which are incorporated herein by reference in their entirety. In a further example, two temporary blockchain digital addresses can be generated based on location parameters of one or more computing devices, including the transacting computing devices.

As shown in FIG. 4, in certain embodiments, at least two temporary digital addresses can be generated. For instance, a first temporary address 420 (also referred to as a sender hash) and a second temporary address 430 (also referred to as a recipient hash) are generated. Each of the temporary addresses 420 430 can be generated based in part on a location parameter of the one or more computing devices associated with the transfer of an asset. For example, the location parameter may be used to generate a temporary private and/or public key pair that is used to create a temporary, location-based digital address (also referred to as a temporary address). Additionally or alternatively, as described herein, the location parameter may be used in salting the hashing of a digital address (e.g., a sender digital address and/or a receiver digital address) to generate a temporary, location-based digital address. In various embodiments, a first temporary address 420 (also referred to as a sender device) is generated based a location parameter of a first computing device 414 associated with a transferor 408. In addition, a second temporary address 430 can be generated based on a location parameter of a second computing device 422 (also referred to as a recipient device) associated with a second transferee 412. In one aspect, around the time of the transfer of a physical asset, the temporary addresses can be generated. The respective entities and/or transacting computing device may be then notified of the temporary private and/or public key.

In various embodiments, the temporary address (and/or digital address) may be shared between transacting computing devices so that the location parameters associated with the temporary address can be independently validated by the other transacting computing device. The temporary address (e.g., the recipient hash and/or the sender hash) may be communicated between transacting computing devices such that each device can independently validate and/or confirm the temporary address. For instance, each transacting computing device may communicate the temporary address via an output that is detectable by the other transacting device. By way of example only, the temporary digital address may be communicated in a message, such as a text message, e-mail, and the like. In one aspect, the output may presented on a display in the form of an alpha-numeric code, a QR code, a bar code, and the like. The output can then scanned by the other computing device. In another aspect, the output is transmitted to the other computing device. For instance, the transacting computing devices may communicate their respective temporary digital address via a near field communication (NFC). In embodiments, the temporary digital address is visually communicated between transacting devices. For example, the first temporary address 420 can be presented on a display associated with the first computing device 414 in the form of a machine readable indicia (such as an alpha numeric code, a QR Code, and the like) such that the second computing device 422 can capture the presented machine readable indicia via a scanner (e.g., a camera). The second computing device 422 may then verify and/or confirm the location parameters associated with the first temporary address 420.

Similarly, the second computing device 422 may communicate the second temporary address 430 with the first computing device 414. In one aspect, the second temporary address 430 can be presented on a display associated with the second computing device 422 in the form of a machine readable indicia (such as an alpha numeric code, a QR Code, and the like) such that the first computing device 414 can capture the presented machine readable indicia via a scanner (e.g., a camera). The first computing device 414 may then verify and/or confirm the location parameters associated with the second temporary address 430. As such, the first computing device 414 and/or the second computing device 422 may independently verify and/or confirm the location parameters associated with the one or more temporary addresses. In some embodiments, the digital asset may be transferred between the first temporary address 420 and the second temporary address 430 based on the independent verification by the first computing device 414, the second computing device 422, or a combination thereof. In various embodiments, the independent verification one or more temporary addresses must occur within designated time limit to confirm the transaction of the digital asset.

As mentioned above, in various embodiments, a private-public key pair can be associated with a computing device (such as the first and second computing device 422, 422). In certain embodiments, the private key associated with a computing device can generate a public key or address, or further employed to generate a temporary, location-based address. For instance, the private key may be used in combination with location parameters associated with the computing device to generate a temporary, location-based public key address via a hashing algorithm. In some embodiments, the public key associated with the private key may be used in combination with location parameters associated with a computing device to generate a temporary, location-based public key address. For instance, using a hashing algorithm, the public key may be hashed along with a location parameter of the computing device. Referring still to FIG. 4, in various embodiments, the private and/or public key associated with a first address 410 and one or more detected location parameters of the first computing device 414 can be employed by the first computing device 414 to generate a first temporary address 420 that corresponds to both the first computing device 414 and a particular detected physical location thereof, thereby creating a temporary, location-based digital address (e.g., a first blockchain digital-physical address). For instance, the public key associated with a first address 410 can be hashed along with the detected location parameters of the first computing device 414 so as to generate a first location based, digital address. Similarly, in various embodiments, the private and/or public key associated with a second address 440 and one or more detected location parameters of the second computing device 422 can be employed by the second computing device 422 to generate a second temporary address 430 that corresponds to both the second computing device 422 and a particular detected physical location thereof, thereby creating a second temporary, location-based digital address (e.g., a second blockchain digital-physical address). For instance, the public key associated with a second address 440 can be hashed along with the detected location parameters of the second computing device 422 so as to generate a second location based, digital address. While two temporary digital addresses are depicted, it is contemplated that only one temporary digital address may be generated. For example, the location parameter(s) of the first and/or second computing device 414 420 may be used to generate a temporary digital address that is independently verified by both the first and/or second computing device 414 420.

The token/coin 402 may then be transferred to the first temporary address 420. Accordingly, any transfer of a digital asset to the temporary address can then be tied to a physical address/location at which the transfer of an asset occurs. Said differently, the asset transfer can be determined to occur at a particular physical location since the transfer of an asset to the temporary address has a verifiable link to a physical location of one or more computing devices through the location parameters used in generating the first temporary address 420. In embodiments, the verifiable link can later be confirmed by one or more nodes in a distributed ledger system to verify the physical transaction of transfer of a physical asset from the first computing entity to the second computing entity based on the location parameters associated with the temporary address. In embodiments where the digital asset is associated with the transfer of a digital asset, this offers greater certainty that the transfer of the digital asset corresponds to the location that coincides with the transfer of a physical asset.

As shown, in certain embodiments, the token/coin 402 can be transferred from the first address 410 to a first temporary address 420, where the first temporary address is a location-based digital address based on the location parameter of the first computing device 414. In turn, the first temporary address 420 can transfer the token/coin 402 to the second temporary address 430, which is also a location-based digital address based on the location parameter of the second computing device 422. In some embodiments, the transferor 408 has access to the first temporary address 420 to authorize a transfer of token/coin 402 from the first temporary address 420 to the second temporary address 430. For example, a temporary private key of the first temporary address 420 may be used to execute the transfer of the digital asset. As a further example, the private key of the first address 410 may be used. Once the token/coin 402 is transferred to the second temporary address 430, the second temporary address 430 can then transfer the token/coin 402 to the second address 440. In some embodiments, the transferee 412 is given access to the second temporary address 430, via the second computing device 422, to authorize a transfer of token/coin 402 from the second temporary address 430 to the second address 440. For example, a temporary private key of the second temporary address 430 may be used to execute the transfer of the digital asset. As a further example, the private key of the second address 440 may be used. All transfer requests can be digitally signed/authorized based on private and/or public keys associated with the respective digital address. In certain embodiments, the transfer of the digital asset between one or more temporary addresses and/or digital address can depend on whether the digital asset is transferred within a designated time limit. In various embodiments, the entire transfer can be based on whether the transfer of the digital asset from the first address 410 to a first temporary address 420, the first temporary address 420 to the second temporary address 430, and/or the second temporary address 430 to the second address 440 is executed within a designated time limit. In certain embodiments, the transfer of the digital asset between each digital address may have a designated time limit. The designated time limit may be any predetermined time. By way of example only, the designated time limit may range from about zero seconds to 24 hours.

In various embodiments, the first and second computing devices 414 422 have corresponding location parameters such that they are physically proximate to one another during the transfer of the token/coin 402, the physical asset 404, or a combination thereof. In various embodiments, a node can identify the location parameters from the first and second temporary addresses 420 430 so as to verify the physical location of the first computing device 414 and the second computing device 422 during the transfer of the asset (e.g., token/coin 402). In further embodiment, the transferor 408 and/or the transferee 412 may capture the unique identifier associated with the physical asset 404 to further verify/authorize the transfer of the physical asset 404. For instance, the first and/or second computing device 414 422 may scan machine readable indicia associated with the label 406 to identify the unique identifier. As a further a further example, the first and/or the second computing device 414 422 may receive the unique identifier via a wireless communication device associated with the physical asset 404. The transfer of the token/coin 402, the physical asset 404, or a combination thereof can then be stored in one or more distributed ledgers.

Similarly, the computing nodes may utilize verified item condition information/data received from the transaction computing devices and/or from the wirelessly connected item and/or parcel (e.g., based on sensors located within the parcel) to verify the item condition prior to storing the same in the distributed ledger. Accordingly, the distributed ledger may utilize verified item condition information/data when enforcing smart contracts based on item condition.

Smart Contracts

In various embodiments, smart contracts can be used to validate/execute a digital transaction based on one or more computing devices having corresponding location parameters. A smart contract can include any algorithm that defines an action or event that is to be triggered based on a determination that one or more defined conditions precedent to the action or event have occurred. In various embodiments, a smart contract can be generated, transmitted, received, stored, validated, and/or verified by any node or computing device described in accordance with the present disclosure. It is further contemplated that a consensus module of each node or computing device in the distributed ledger network is capable of interpreting and executing a Turing complete programming language, such as Solidity, by way of non-limiting example. It is further contemplated that in some embodiments, the Blockchain and/or distributed ledger itself is implemented based on the same programming language.

In various embodiments, smart contracts stored on the Blockchain and/or distributed ledger can be associated with a corresponding address, similar to that of a wallet address. The smart contract can be assigned a corresponding digital address by the distributed ledger network, or can be associated with a wallet address associated with one or more private keys. Counterparties associated with a smart contract can verify, via their respective computing devices in communication with one or more nodes of the distributed ledger network, that the smart contract has been immutably stored onto the Blockchain and/or distributed ledger based on a determined consensus of the nodes.

As smart contracts can be stored on the Blockchain and/or distributed ledger, each node (or designated node) can independently determine whether a smart contract's defined conditions precedent have occurred in order to verify that the terms of the smart contract have been met. In various embodiments, each node (or designated node) can determined occurrence of defined conditions precedent based on electronic information communicated thereto or retrieved thereby. The electronic information can include, among other things, another transaction addressed to or referencing the smart contract, data from one or more computing devices remote from the distributed ledger network, data from a website, data from a database, published news events, published weather events, or any other type of electronic information that can be transmitted to or accessed by a node (or designated node) via a network.

Like other transactions, each node (or designated node) can communicate this verification to one or more neighboring nodes (e.g., other nodes in direct communication with the node or designated node) until a consensus of the nodes (or designated nodes) of the distributed ledger network have collectively verified occurrence of the defined conditions precedent. Based on a determination that the defined conditions precedent has been verified by a consensus of the nodes, the event or action defined by the smart contract can be executed. In various embodiments, the event or action can include the processing of a transaction (e.g., a processing of a transfer for digital assets or value) that is held or locked until a determination that the conditions precedent have occurred. In this regard, any digital asset that is subject to the smart contract can be locked (e.g., held in escrow) by the smart contract until the determination has been made.

Smart contracts may be configured for execution based on various trigger events, information/data parameters, parcel or item conditions (e.g., as reflected by information/data stored within the distributed ledger), and/or the like. In various embodiments, the smart contracts may be executed by a transfer of value (e.g., reflected in a separate distributed ledger corresponding to a virtual currency, such as Bitcoin, Ethereum, Litecoin, Ripple, Dogecoin, and/or the like), by initiating a particular action (e.g., executable entirely within the distributed ledger and/or at least partially executable outside of the distributed ledger, for example, by initiating a transfer of currency through traditional banking institutions), and/or the like. Examples of such smart contracts for transferring value are described below. It should be understood that such transfers of value are merely exemplary of various smart contracts that may be executed as a portion of a distributed ledger system as described herein, and these examples should not be construed as limiting.

As noted above, various embodiments may comprise ledger-specific smart contracts, such as parcel specific smart contracts and item specific smart contracts. As just one non-limiting example, the parcel specific smart contracts may be based on the completion of shipping services in accordance with applicable shipping requirements, and the item-specific smart contracts may be based on the maintenance of applicable item conditions during the completion of the shipping services. For example, the parcel specific smart contracts may be configured to automatically transfer value (e.g., a digital currency) from the consignor to the carrier upon completion of shipping services to deliver the parcel within an applicable pick-up/transfer/delivery time-period and to an applicable pick-up/transfer/delivery destination. As another example, the item specific smart contracts may be configured to automatically transfer value (e.g., a digital currency) from the carrier to the consignor upon a determination that the item was not maintained within applicable item conditions (e.g., temperature conditions, drop limitations, and/or the like).

The smart contract may be stored on one or more distributed ledgers and/or databases. In various embodiments, a node within a plurality of nodes may reference or employ a smart contract to validate or execute the transfer of the physical asset (e.g., a parcel), the digital asset (e.g., a token, coin, currency), or combination thereof. As mentioned, smart contracts may be configured to be executed based on various trigger events, information/data parameters, parcel or item conditions (e.g., as reflected by information/data stored within the distributed ledger), and/or the like.

In one embodiment, verifying and/or executing the smart contract may depend on information/data parameters associated with the one or more computing devices. The one or more computing devices may be proximate to a physical location of where a transfer of a physical asset, a digital asset, or combination thereof occurs. Additionally or alternatively, the one or more computing devices may be associated with the entities participating in the transaction. For example, the one or more computing devices may be associated with a transferor and a transferee. As used herein, transferor and transferee is meant to be interpreted broadly as it can refer to any type of entity (machine, device, person, organization, corporation, etc.) that is associated with and/or participating in the transaction of an asset (physical and/or digital). As a further example, the one or more computing devices may be associated with a physical asset that is being transferred (e.g., a physical asset that is IoT enabled via one or more sensors). The one or more computing devices may be a computing device(s) that is physically proximate the location of the transfer of an asset but may not itself be a transacting computing device. Accordingly, a node may rely on information/data parameters associated with the one or more computing devices in order to verify or execute a smart contract In various embodiments, the information/data parameters are location parameter(s) that may be associated with one or more computing devices. For instance, in one embodiment, the signals received by the one or more computing devices at the physical location may include GPS signals, WiFi signals, Bluetooth signals, radio tower signals, and the like. In one embodiment, the signals can include at least one of a set of GPS coordinates, a set of wireless signal identifiers, or a set of radio tower identifiers. In general, the location parameters may represent a physical address/location of the computing device in the physical word. The information/data parameters can be transmitted at any point. For example, the information/data parameters can be transmitted based on a predefined event, such as the act of capturing the unique identifier of the physical asset (e.g., a parcel), and/or a request to transfer the digital asset (e.g., a token, coin, currency), capturing a code associated with another device (e.g., an output presented for display, such as a QR code), or a combination thereof. Accordingly, the set of set of wireless signal identifiers can be transmitted to one or more nodes for validation.

The location parameters may be captured from one or more computing devices. In embodiments, the location parameters are determined via one or more of the transacting computing devices (e.g., a transferee computing device and/or a transferor computing device). In further embodiments, the location parameters are received by one or more computing devices proximate the physical location of the transfer. In other words, the one or more computing devices may be physically proximate the location of the transaction but may not itself be a transacting computing device. For example, the computing device may be a smartwatch, a delivery vehicle, and/or any other nearby computing devices. In embodiments, relying on location parameters from computing devices other than the transacting computing device(s) may further ensure that none of the transacting computing devices are "spoofing" (e.g., falsifying) its location parameter.

In various embodiments, the smart contract may address a location parameter(s) of one or more computing devices before validating the transfer of the asset (digital and/or physical). That is, the smart contract may not authorize the transfer of the asset unless location parameters associated with one or more computing devices correspond to one another (e.g., a transferor computing device, transferee computing device, and any peripheral computing devices that are physically located near the transfer), indicating that the one or computing devices are physically located proximate to each other. In this way, the physical location of an asset transfer (a physical and/or digital asset) captured in the distributed ledger can be authenticated. It should be appreciated that the location parameter(s) may be embedded within the request itself (i.e., within the same communication) or submitted independently of the request (i.e., in a separate communication).

As mentioned, the smart contract can rely on information/data parameters associated with one or more computing devices associated with the transaction before executing and/or verifying a transfer of a physical asset, a digital asset, or combination thereof. This can offer an improvement over conventional technology as each transaction/block can be linked to a physical location. This provides enhanced security and reliability of each transaction/block in the distributed ledger as one or more devices and/or nodes can subsequently verify a location in the physical world that the digital transaction took place. For instance, information that identifies the physical location of one or more computing devices involved in the transfer of the digital asset, and the smart contract verifying the transaction based on that physical location, may be determined from a transaction/block of the distributed ledger. This may enhance the security of the digital transaction because information/data parameters associated with one or more computing devices because it associates the digital transaction to a physical location. In another embodiment, the location of the digital transaction may be relevant when the digital transaction itself is associated with a physical transaction (such as transferring a physical asset between two entities). Accordingly, embodiments are capable ensuring further security and trust in a distributed ledger that is used to store and track the physical movement of the physical and/or digital asset.

Figure 5:
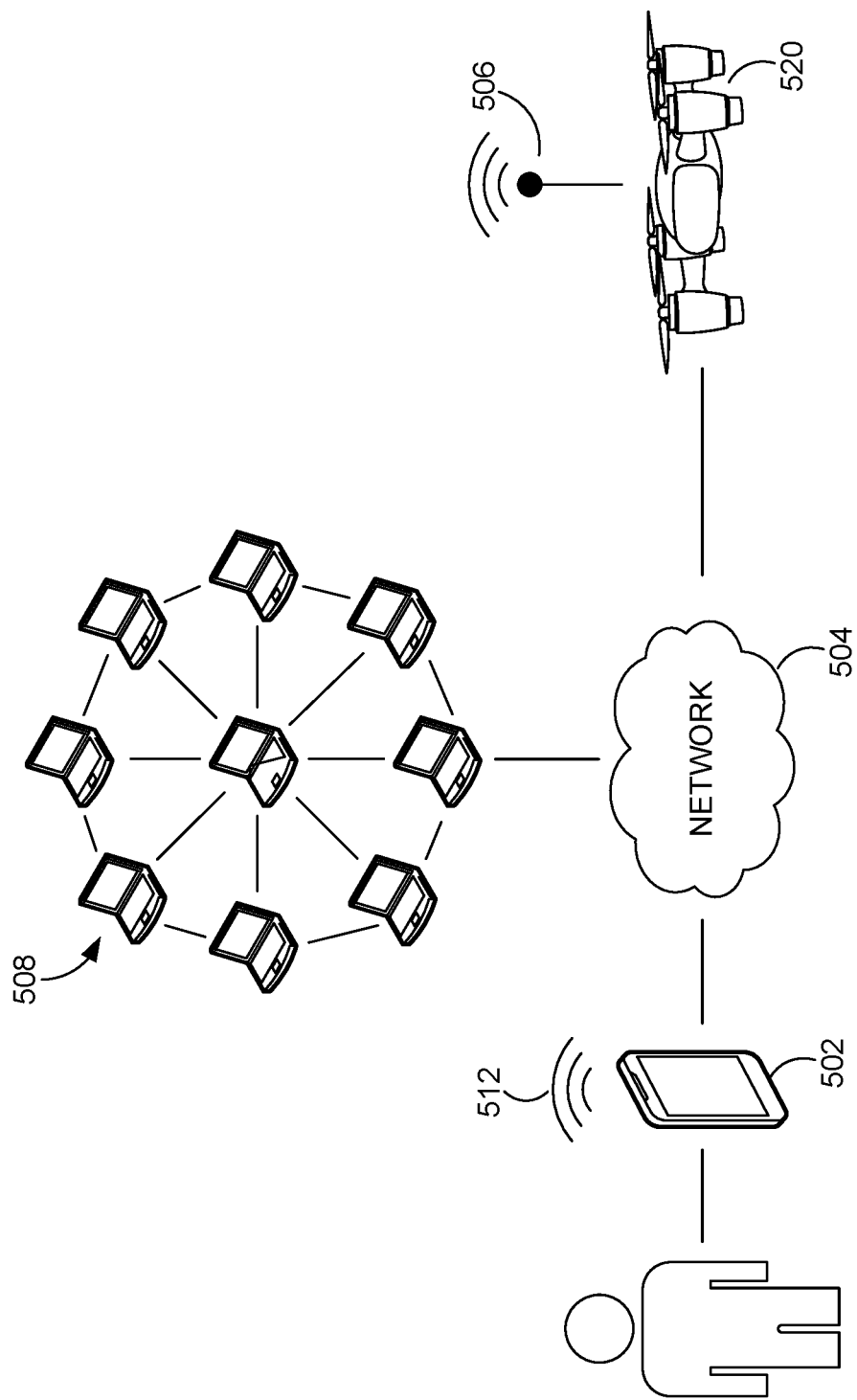
FIG. 5 depicts a system for synchronizing digital transactions with verifiable physical locations in accordance with certain embodiments of the present disclosure.

Turning now to FIG. 5, it illustrates a system for synchronizing digital transactions with physical locations in accordance with certain embodiments of the disclosure. In certain embodiments, a smart contract may address a transferor's request and/or the transferee's request to exchange the physical asset (e.g., a parcel), the digital asset (e.g., a token, coin, currency), or a combination thereof. As mentioned, in embodiments, the smart contract can be employed during the validation or execution of a transfer of an asset. For example, the smart contract may rely on information/data parameters received from and/or associated with one or more computing devices before validating and/or executing the exchange of the physical asset (e.g., a parcel), the digital asset (e.g., a token, coin, currency), or a combination thereof.

In one embodiment, the smart contract addresses a transferor request that is communicated by a first computing device 502. The transferor request may comprise a request to transfer a digital asset from a first address associated with the first computing device 502 to a second address associated with a second computing device 520. In one aspect, the digital asset may correspond to a unique identifier associated with a physical asset. As such, the smart contract may reference and/or address the unique identifier as part of executing the exchange of the digital asset.

In embodiments, the smart contract may rely on information/data parameters determined by the first computing device 502 in order to validate or execute the transfer of the exchange the physical asset (e.g., a parcel), the digital asset (e.g., a token, coin, currency), or a combination thereof. For instance, the first computing device 502 may determine one or more location parameters associated with the physical location of the first computing device 502. The first determined location parameter can be a set of GPS coordinates, a set of wireless signal identifiers, or a set of radio tower identifiers, and may be determined by the first computing device 502 based on signals 512 received at a physical location thereof. The location parameters may be any location based data that is agreed to by the transacting entities. The first computing device 502 can then communicate the received transferor request, including at least a first determined location parameter, to at least one node in a plurality of nodes of a distributed ledger network 508. In one aspect, the transferor request is communicated via a wireless network 504.

As mentioned, in one embodiment, the digital asset/token may correspond to a unique identifier associated with a physical asset (not shown). In some embodiments, the unique identifier can be captured by a transacting computing device along with the transfer of the digital asset/token. The unique identifier can be captured before, during, or after the transfer of the digital asset/token. In one aspect, the unique identifier is captured by the first computing device 502. The unique identifier can be captured in any number of ways. For instance, the unique identifier can be captured via scanning a label associated with the physical asset. Alternatively, the unique identifier can be captured based on receiving a wireless signal from a transmitter associated with the physical asset. The unique identifier may also be entered manually via an input (e.g., a keyboard presented on a touchscreen) of the first computing device 502. In one aspect, first computing device 502 communicates the unique identifier as part of the transferor request. For instance, the unique identifier can be communicated as part of the information/data parameters of the first computing device 502.

In embodiments, the smart contract may validate the exchange the physical asset (e.g., a parcel), the digital asset (e.g., a token, coin, currency), or a combination thereof based on the transferor's request and the information/data parameters. It is within the scope of this disclosure that the smart contract may further require approval from a transferee accepting the asset. In aspects, one or more nodes can subsequently verify the physical location of first computing device 502 during the transfer of the physical asset (e.g., a parcel) and/or the digital asset (e.g., a token, coin, currency), or a combination thereof, and validate the transaction for storage on one or more distributed ledgers. In embodiments, a confirmation can be transmitted from a node in the plurality of nodes 508 to the first computing device 502 approving the transfer of the physical asset (e.g., a parcel), the digital asset (e.g., a token, coin, currency), or a combination thereof.

In one embodiment, the smart contract may address a transferee's request that is communicated by the second device 520. This may be in combination or independently of the transferor's request from the first computing device 502. The transferee's request may be generated by a second computing device 520 and may comprise a request to receive the digital asset. The request may be received at a second address from the first digital address. In one aspect, the second digital address may be associated with and/or accessed by the second computing device 520.

In embodiments, the smart contract may rely on information/data parameters determined by the second computing device 520 in order to validate or execute the transfer of the exchange the physical asset (e.g., a parcel), the digital asset (e.g., a token, coin, currency), or a combination thereof. For instance, the second computing device 520 may determine one or more location parameters associated with the physical location of the second computing device 520. The second determined location parameter can be a set of GPS coordinates, a set of wireless signal identifiers, or a set of radio tower identifiers, and may be determined by the second computing device 520 based on signals 506 received at a physical location thereof. The second computing device 520 can then communicate the transferee request, including at least a second determined location parameter, to at least one node in a plurality of nodes of a distributed ledger network 508. In one aspect, the transferee request is communicated via a wireless network 504.

As mentioned, in one embodiment, the digital asset may correspond to the unique identifier associated with the physical asset (not shown). The unique identifier may be captured before, during, or after the transfer of the digital asset. In one aspect, the unique identifier is captured by the second computing device 520. The unique identifier can be captured in any number of ways. For instance, the unique identifier can be captured via scanning a label associated with the physical asset. Alternatively, the unique identifier can be captured based on receiving a wireless signal from a transmitter associated with the physical asset. The unique identifier may also be entered manually via an input (e.g., a keyboard presented on a touchscreen) of the second computing device 520. In one aspect, second computing device 520 communicates the unique identifier as part of the transferor's request. For instance, the unique identifier can be communicated as part of the information/data parameters of the second computing device 520.

In embodiments, the smart contract may validate the exchange the physical asset (e.g., a parcel), the digital asset (e.g., a token, coin, currency), or a combination thereof based on the transferee's request and the information/data parameters. It is within the scope of this disclosure that the smart contract may further require approval from a transferor accepting the exchange. In aspects, one or more nodes can subsequently determine the physical location of second computing device 520 during the transfer of the physical asset (e.g., a parcel) and/or the digital asset (e.g., a token, coin, currency), or a combination thereof, and validate the transaction for storage on one or more distributed ledgers. In embodiments, a confirmation can be transmitted from a node in the plurality of nodes 508 to the second computing device 520 approving the transfer of the physical asset (e.g., a parcel), the digital asset (e.g., a token, coin, currency), or a combination thereof.

In one embodiment, the smart contract may address the combination of the transferee's request and the transferor's request. For instance, the smart contract may not validate the transfer of the asset until it is determined that the first location parameter of the first device corresponds to the second location parameter of the second device. For instance, the smart contract may validate the transfer of the asset based on a determination that the physical location of the first computing device 502 corresponds to the physical location of the second computing device 520. In aspects, one or more nodes can subsequently determine the physical location of both computing devices during the physical asset (e.g., a parcel) and/or the digital asset (e.g., a token, coin, currency), or a combination thereof, and validate the transaction for storage on one or more distributed ledgers. A confirmation can then be communicated to one or more computing devices validating the transfer.

In further embodiments, the transferor and/or the transferee request to transfer the digital asset may be associated with an output of the first computing device 502 and/or the second computing device 520. For example, during the transfer of the asset, the first computing device 502 and/or the second computing device 520 may generate an output that, at least in part, identifies the digital address in which the digital asset is to be transferred to or from. In a further example, the output may be communicated in a message, such as a text message, e-mail, and the like. Any and all forms of communicating the output from one computing device to the other are within the scope of this disclosure. In one aspect, the output may presented on a display in the form of an alpha-numeric code, a QR code, a bar code, and the like. The output can then scanned by the other computing device. In another aspect, the output is transmitted to the other computing device. In any case, the first computing device 502 and/or the second computing device 520 associate the output with the request to transfer the digital asset.

Figure 6:
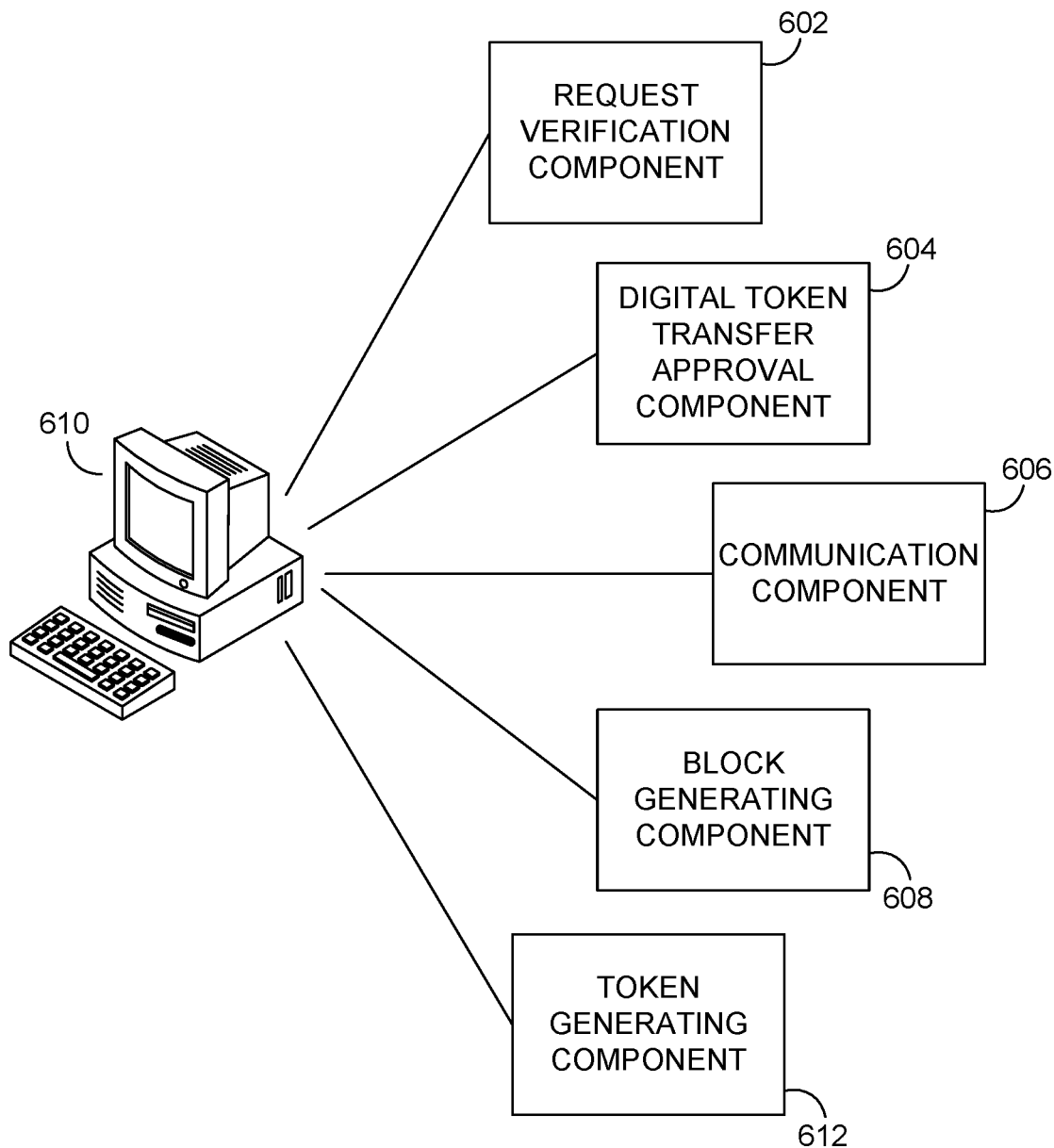
FIG. 6 is a schematic of a computing node in accordance with certain embodiments of the present disclosure.

Referring now to FIG. 6, a node 610 is depicted in accordance with an embodiments described herein. The node 610 (such as the computing device 110 and/or computing node 100) may be a distributed network node and may comprise one or more components to validate and/or execute the transfer of an asset (physical and/or digital). The one or more components may be embodied in a hardware component, software component, and/or computer executable code. As shown, the node 610 may comprise a request verification component 602. The request verification component 602 may parse a transfer request (e.g., a transferor request and/or a transferee request) to determine one or more parameters contained therein. For example, the request verification component 602 may use one or more public keys to verify a transfer request and determine information/data parameters contained therein. In one embodiment, the request verification component 602 may determine a location parameter(s) associated with the transfer request. For example, the request verification component 602 may determine a first location parameter from a transferor's request that is associated with a first digital address. Additionally or alternatively, the verification component 602 may determine a second location parameter from a transferee's request that is associated with a second digital address. The request verification component 602 may then determine whether the first location parameter corresponds to the second location parameter. For example the request verification component 602 may determine that the location parameters are within a predefined range of each other. The predefined range may from about zero to a hundred feet, or from about zero to a hundred miles. It is contemplated that the location parameter may be communicated independently of the transfer request, but otherwise associated with the request as it is a location parameter of a computing device accessing the digital address and requesting the transfer of the asset.

In various embodiments, the request verification component 602 may determine, from a transfer request, whether a digital asset corresponds to a unique identifier of a physical asset. For instance, the request verification component 602 may determine whether the digital asset corresponds to the unique identifier captured by one or more computing devices. In various embodiments, the request verification component 602 may rely on one or more distributed ledgers and/or databases.

In one embodiment, the node 610 may comprise a digital asset transfer approval component 604. The digital asset transfer approval component 604 can determine whether there is digital asset stored at a digital address from which the token is being transferred. For example, digital asset transfer approval component 604 may determine from one or more distributed ledgers whether the digital asset had been transferred to the digital address. In certain embodiments, the digital asset transfer approval component 604 approves the transfer of the digital asset in one or more transfer requests from one or more computing devices if the transfer request comprises a location parameter. For instance, the digital asset transfer approval component 604 can validate a received transferor request associated with a first digital address if the transferor request comprises a location parameter. Additionally or alternatively, digital asset transfer approval component 604 can validate the transfer of the digital asset of a transferee request associated with the second digital address if the transferee request comprises a location parameter. In various embodiments, the digital asset transfer approval component 604 can validate the transfer of a token based at least in part on a determination that the received transferor request associated with the first digital address, and the received transferee request associated with the second digital address, each includes the corresponding set of determined location parameters that correspond to the common physical location.

In various embodiments, the node 610 may comprise a communication component 606. The communication component 606 may communicate one or more transfer requests to a neighboring node of the distributed ledger based on determining the transfer request (e.g., a transferor and/or a transferee) is valid. For instance, the communication component 606 may communicate the received transferor request associated with the first digital address, along with any associated with information/parameters described herein, to a neighboring node. Additionally or alternatively, the communication component 606 may communicate the received transferee request associated with the second digital address, along with any associated information described herein, to a neighboring node. The communication component 606 may communicate with a neighboring node via a network. In addition, the communication component 606 may communicate one or more transfer request in the form of a new transaction and/or block that is generated through a hashing algorithm.

In certain embodiments, the node 610 may have a transaction/block generating component 612 for generating a new transaction/block for the transfer of an asset (digital and/or physical). For example, the transaction/block generating component 612 may utilize a hashing algorithm to generate a hashed output from a hashing input. In various embodiments, the hashing input may include one or more of the transferor request to transfer an asset, transferee request to transfer an, one or more parameters of a computing device(s), one or more digital addresses, one or more temporary digital addresses, one or more smart contracts, and/or any information discussed herein. The hashing input may further include previously stored data in one or more prior transaction/block in one or more distributed ledgers. Accordingly, a unique hashing output may be generated for each new transaction/block. The unique hashing output may provide an immutable link, linking the new transaction/block to one or more previous transaction/blocks of one or more distributed ledgers.

The hashed output and/or the new block can then be communicated by the communication component 606 and/or stored in the one or more distributed ledgers. In further embodiments, the one or more distributed ledgers may follow a particular format for the hashed output. For example, the format of the hashed output (also referred to a hashing format) may require the hashed output for the new transaction/block generating component 612 include one or more zero bits preceding the hashed output. Accordingly, in certain embodiments, the transaction/block generating component 612 may utilize a nonce in combination with the information to be included in the new transaction/block. In general, the hashing format may be used to introduce computational difficulty in generating the new transaction/block. For example, the distributed ledger may require one or more zero bits preceding the hashed output. The hashing format may range in complexity so as to facilitate a slower or faster transaction time of adding transactions/blocks to the distributed ledger. It is within the scope of this disclosure that the transaction/block generating component 612 may combine one or more transaction requests into the new transaction/block for storage on the distributed ledger.

In various embodiments, the node 610 may comprise a token generating component 612. The token generating component may generate a token/coin through mining and/or through receiving compensation from a transferee. Once generated, the token can then be stored at a digital address and later transferred to a different digital address using a public/private key. In addition, as discussed above, the token/coin may be associated with a physical asset. For example, the token may be a unique token that is associated with a physical asset. In one embodiments, the unique token may have a unique digital identifier that is linked to a unique identifier associated with the physical asset. In a further embodiment, the unique token is generated based on the unique identifier associated with the physical asset. For instance, the unique token may be generated via a hashing algorithm of the unique identifier. The unique identifier may then be physically associated with the physical asset. For example, the unique identifier may be associated with the physical asset itself or may be associated with a crate, a shipping pallet, a shipping container, and the like, that contains of the physical asset.

Synchronizing Parallel (or Partially Parallel) Distributed Ledgers

Various embodiments encompass a plurality of parallel, or partially parallel distributed ledgers providing shipping/tracking information for parcels, parcel labels, and/or the items contained within those parcels and/or a label on the item itself separately. The plurality of distributed ledgers may be managed and/or at least partially synchronized by a distributed ledger management system. In certain embodiments, the distributed ledger management system may itself be distributed, and may comprise a plurality of computing nodes 100 (e.g., computing nodes 100 storing information/data stored in a plurality of distributed ledgers managed by the system). Accordingly, the distributed ledger management system may be configured to retrieve and/or share information/data between a plurality of distributed ledgers (e.g., blockchains). For example, to the extent that information/data stored in distributed ledgers is replicated between a plurality of distributed ledgers, the distributed ledger management system may be configured to automatically share information/data between the plurality of distributed ledgers.

In certain embodiments, a first distributed ledger provides shipping/tracking information/data relating to various parcels and/or parcel labels, and a second distributed ledger provides shipping/tracking information relating to items and/or item labels within those parcels. Accordingly, a complete chain of control for the items may encompass activities occurring before and/or after shipment of the item in a corresponding parcel.

Moreover, each distributed ledger may be configured for executing corresponding smart contracts relating to the parcel, parcel label, the item, or the item label, separately. For example, the parcel-based distributed ledger may be configured for monitoring parcel shipment parameters, and the item-based distributed ledger may be configured for monitoring item condition parameters.

In certain embodiments, the distributed ledger management system (e.g., one or more of the computing nodes 100 encompassing the distributed ledger management system) may be configured to automatically generate new transactions/blocks in each distributed ledger to reflect simultaneous movement of a parcel and an item contained within the parcel. In certain embodiments, upon receipt of information/data indicating a particular parcel is moving within a carrier network (e.g., a computer node receiving information/data from one or more transaction computing devices indicative of the movement of a shipment/item), the computing node may be configured to update both the parcel distributed ledger and the item distributed ledger to reflect the change of control of the parcel and the item contained within the parcel.

In certain embodiments, the computing nodes 100 may be configured to simultaneously and/or periodically provide information/data specific to one of the plurality of distributed ledgers. For example, item condition information/data (e.g., item temperature, sensed shocks/impacts, and/or the like) may be provided and stored within the item distributed ledger, without providing the same information/data to the parcel distributed ledger.

Transferring Value Upon Completion of a Parcel and/or Item Transport

In various embodiments, value may be transferred to the carrier to complete shipping services. In certain embodiments, value may be transferred to the carrier prior to completing the shipping services, however in certain embodiments, value may be transferred to the carrier only upon successfully completing the shipping services. In the former embodiments, value may be transferred to the carrier prior to completing the shipping services, however value may be transferred back to the consignor (and/or another party) upon determining that the shipping services were not completed according to prescribed parameters. For example, upon determining that the shipment/item was delivered late, delivered to the wrong location, and/or the like, the distributed ledger may be configured to automatically transfer at least a portion of the value of the shipping services back to the consignor and/or consignee.

In other embodiments, the distributed ledger may be configured to automatically transfer value from the consignor (and/or consignee) to the carrier upon completion of the shipping services. The amount of value transferred to the carrier may be based on a determination of whether the shipping services were completed according to prescribed parameters. Upon determining that the shipping services were completed according to prescribed parameters, an agreed-upon full value of the shipping services may be transferred to the carrier. However, upon determining that the shipping services were not completed according to prescribed parameters, only a portion of the agreed value may be transferred to the carrier.

In certain embodiments, completion of shipping services may be ascertained based at least in part on verified information/data provided to and stored within the distributed ledger from one or more transaction computing devices. In certain embodiments, the information/data provided to the distributed ledger may be indicative of the parcel being located at a predefined location (e.g., a destination location). For example, upon the parcel arriving at a destination location corresponding to the parcel, one or more transaction computing devices (e.g., the parcel, one or more handheld devices, and/or the like) may be configured to verify the location of the parcel, and may provide information/data to the distributed ledger indicative of the location of the parcel being at the corresponding destination location. Upon determining the location of the parcel is a predefined corresponding location, as discussed above, one or more applicable smart contracts may be configured to transfer value to the carrier.

In certain embodiments, determining the completion of shipping services may be ascertained based at least in part on information/data indicating a particular task and/or transaction has occurred. For example, one or more transaction computing devices may be configured to verify a delivery task has been completed for a particular parcel. The one or more transaction computing devices may provide information/data to the distributed ledger indicating that the delivery task has been completed, and may execute a smart contract to transfer value to the carrier for the completion of the delivery task.

It should be understood that any of a variety of trigger events (e.g., verified information/data indicative of the occurrence of a trigger event) may be utilized to execute one or more smart contracts. For example, various smart contracts may be executed upon a parcel being picked up and/or the possession of the parcel being transferred between parties (e.g., between multiple carriers).

Transferring Value Based on Parcel and/or Item Condition

Moreover, as discussed herein, the distributed ledger system may be configured to transfer value based on an agreed upon value of the item transported within the condition. In certain embodiments, the distributed ledger system may monitor the condition of the item during transit (e.g., based on information/data received from the sensors within the parcel), and may automatically determine whether value should be transferred based on the condition of the item. For example, upon determining that the item was exposed to temperatures outside of a prescribed range, the item was dropped, the item was crushed, and/or otherwise damaged, the distributed ledger system may automatically transfer value from the carrier to the consignor and/or consignee. Moreover, upon determining that the item was destroyed, the distributed ledger system may automatically transfer the entire value of the item from the carrier to the consignor and/or consignee.

Verifying Physical Proximity in Digital Asset Transfers

Various embodiments provide for verifying the physical proximity of two counterparty devices during the transfer of a token/coin. As described herein, two temporary digital addresses may be generated to facilitate the transfer of a token/coin, as shown in FIG. 4. For instance, the token/coin 402 may be transferred through a first temporary address 420 and a second temporary address 430. However, as noted in reference to FIG. 4, a single temporary digital address may be generated to verify the physical proximity of the transacting devices to ensure that the counterparty devices are physically located near each other during the transfer of a token/coin.

Figure 7:
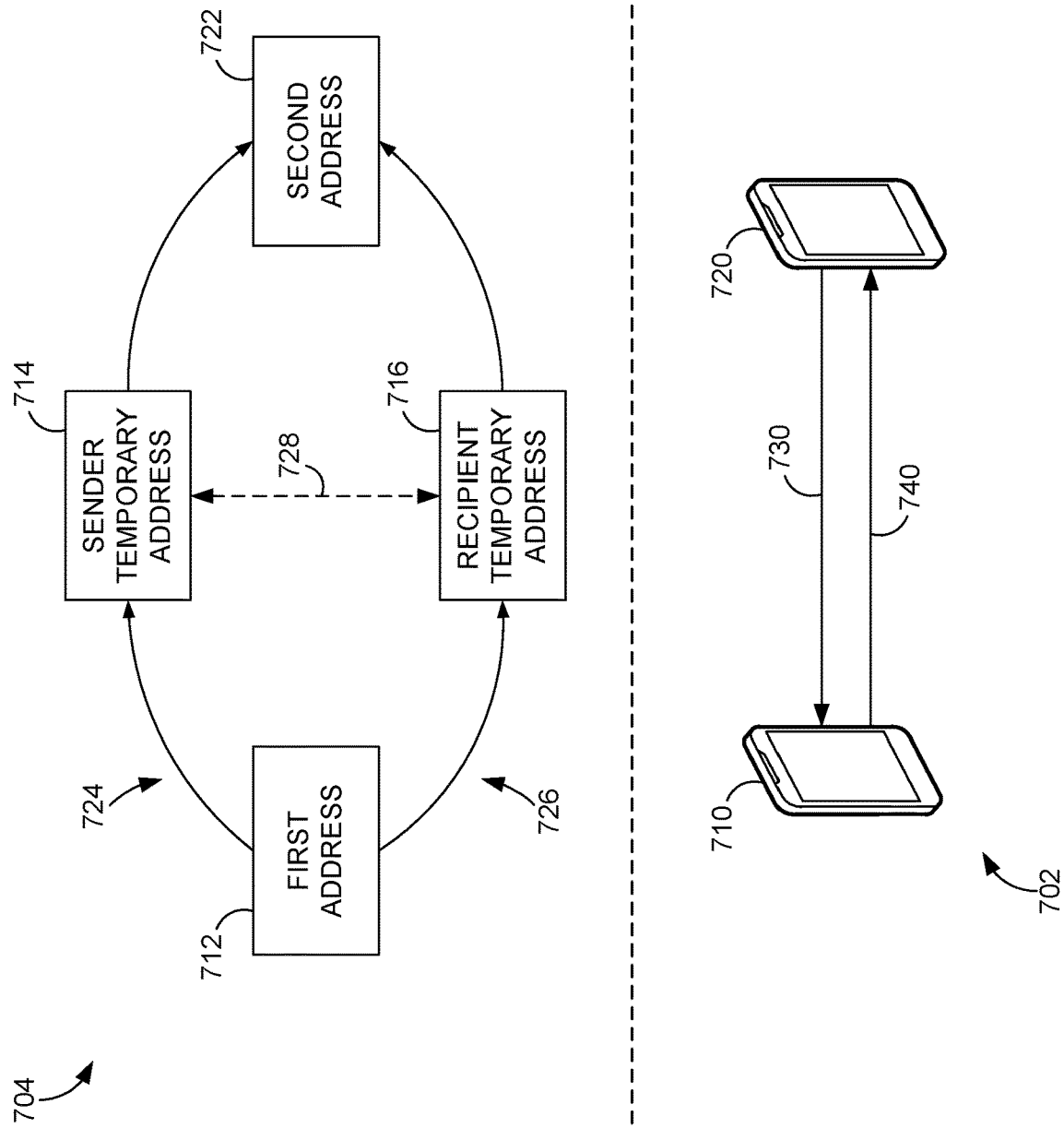
FIG. 7 illustrates synchronization of digital transactions with verifiable physical locations in accordance with certain embodiments of the present disclosure.

FIG. 7 illustrates how, at a minimum, a single temporary digital address may be generated to facilitate the transfer of a token/coin between two digital addresses. The temporary digital address can thus require the physical proximity between two devices in transferring a token/coin. As shown, element 702 depicts how the physical proximity of two counterparty devices may be required to enable the electronic transaction of a token/coin, shown by element 704. It is contemplated that the token/coin may be tied to or otherwise associated with a physical asset such that the transfer of the token/coin may represent the transfer of a physical asset.

As shown, the token/coin may be transferred from a first address 712 to a second address 722 using a single temporary digital address (e.g., a sender temporary address 714 or recipient temporary address 716). Accordingly, the token/coin may be transferred through a particular transaction stream. In a first transaction stream 724, the token/coin may be transferred through the sender temporary address 714. The token/coin may also follow a second transaction stream 726, in which the token/coin may be transferred through the recipient temporary address 716. A third transaction stream 728 is also contemplated in which the token/coin is transferred between both the sender temporary address 714 and the recipient temporary address 716.

Each transaction stream may require a particular confirmation process. In general, the confirmation process comprises deciphering a hash and determining that the hash corresponds to the temporary digital address. For example, the confirmation of the first transaction stream 724 may require that the sender temporary address 714 is confirmed by the recipient device 720 deciphering a sender hash. The confirmation of the second transaction stream 726 may require that the recipient temporary address 716 is confirmed by the sender device 710 deciphering a recipient hash. It should be appreciated that in particular embodiments where the token/coin is transferred between the sender temporary address 714 and the recipient temporary address 716, both devices confirm each other device's temporary address. In other words, to enable the third transaction stream 728, the sender device 710 and the recipient device 720 may have to confirm the other's temporary address through deciphering their respective hashes.

In general, a computing device may generate the temporary digital address and/or the hash based on salting the hashing of a public key in combination with data that is independently accessible and/or derived by one or more computing devices. As noted, the term salting may refer to using two or more data inputs in a cryptographic hashing function to create a single hashed value. In some embodiments, the first input may be a public key (e.g., an address) while the remaining inputs may be data that is independently accessible by either computing device. The independently accessible data may be a data type that produces similar results when computing devices are physically proximate, such as data obtained from one or more of a device's sensors. Using independently accessible data, a temporary digital address and/or the hash can be generated by one device and confirmed by the other device. For instance, in some embodiments, the independently accessible data may comprise a location parameter, such as GPS coordinates, Wi-Fi signals, radio tower signals, and the like.

In various embodiments, the location parameter of a device may be confirmed through a multi-point verification process. For example, the sending device 710 and/or the receiving device 720 may obtain a set of location parameters from nearby computing devices, such as a computing device associated with a delivery vehicle, a carrier's mobile device, a smart parcel (or other smart devices), a building, and the like. Additionally or alternatively, the set of location parameters may comprise one or more signals detected or received by a device itself, such as GPS signals, WiFi signals, Bluetooth signals, and/or radio tower signals. The set of location parameters may ensure that a device is not "spoofing" or falsifying its physical location.

In various embodiments, the location parameter and/or a set of location parameters may be used along with a public key (and/or a digital address) as input into a cryptographic hashing algorithm to generate a temporary digital address (e.g., a recipient hash and/or a sender hash). The hashing algorithm may be any hashing algorithm (e.g., SHA-256, RIPEMD 160, and the like) capable of creating a single hashed value. This hashed value may, in turn, be used as a temporary address (e.g., a digital-physical temporary address). The temporary address may then be communicated with a counterparty device as a hash value (e.g., a recipient hash and/or a sender hash). In other words, a device's associated public key (and/or digital address) can be salted with a detected location parameter and/or a detected set of location parameters.

In various embodiments, each respective device generates its own respective temporary digital address. For instance, the sender device 710 may generate a sender temporary address 714. The sender temporary address 714 may be generated based on hashing the first address 712 along with the location parameters of the sender device 710. Similarly, a recipient device 720 may generate the recipient temporary address 716. The recipient temporary address 716 may be generated based on hashing the second address 722 with the location parameters of the recipient device 720. Generating the temporary digital addresses, in part, can ensure that the counterparty devices share a common physical location at the time of a digital asset transfer. While discussed in greater detail below, these digital addresses may be communicated as a recipient hash and/or a sender hash.

In some embodiments, a computing device may generate the temporary address in response to or based on identifying the physical asset that is being transferred between the transacting entities. For instance, while not shown, the recipient device 720 and/or the sender device 710 may identify a physical asset (e.g., a parcel) by scanning (e.g., via a camera) a unique, physical identifier (e.g., a label) that is associated with the physical asset. Additionally or alternatively, the physical asset may be identified through a unique identifier transmitted by the physical asset through wireless communication (e.g., NFC) to the computing device(s). Identifying the physical asset may cause the computing device(s) to generate a temporary digital address. Additionally or alternatively, in some embodiments, the temporary digital address may only be created unless the computing device identifies a valid unique identifier for the physical asset. In some embodiments, the unique identifier may be valid if the computing device confirms the unique identifier with a data source, such as database or distributed ledger. In some aspects, the database or distributed ledger may be maintained by the logistics provider.

As noted above, the temporary address of one device may be confirmed by another computing device. In some embodiments, this confirmation process can enable the transfer of a token/coin between one or more addresses. For example, the confirmation process may encumber/un-encumber the transaction. Additionally or alternatively, the temporary address may not be generated unless confirmed by a counterparty device.

To transfer the token/coin, one or more temporary addresses must be confirmed. Referring to FIG. 7, to transfer the token/coin in the first transaction stream 724, the recipient device 720 may confirm the sender temporary address 714. Similarly, in the second transaction stream 726, the sender device 710 may confirm the recipient temporary address 716. In some embodiments, both temporary addresses are confirmed. This may occur when the token/coin is transferred between two temporary addresses, such as through the third transaction stream 728. In the third transaction stream 728, the token/coin may be transferred between the sender temporary address 714 and the recipient temporary address 716. Because both temporary addresses are employed, each counterparty device may have to confirm the other device's respective temporary address.

In some embodiments, confirming the temporary address may include a communication of a hashed value and a public key between counterparty devices. The information can be communicated through one or more techniques and/or communication medium that ensures the physical proximity of the computing devices, such as through optical recognition and/or short-range wireless transmissions. Optical recognition may require a computing device display certain information (e.g., the temporary digital address and/or a public key) through a visual output (e.g., a QR code). This may ensure physical proximity since, in order to obtain that information, the computing device has to be close enough to scan the displayed information via the optical sensor (e.g., a camera). As another example, the communication medium may be a wireless signal that is communicated and/or received by wireless communication sensors. The wireless communication may be a short-range wireless signal, such as an NFC signal, or an RFID signal. The short-range wireless signal may ensure physical proximity since, in order to obtain that information, the computing device has to be close enough to receive the displayed information via the short-range wireless communication.

As noted, the counterparty devices may communicate a hashed value (e.g., the temporary digital address) and a public key (e.g., an address). For example, referring to FIG. 7, as depicted by element 740, the sender device 710 may communicate the necessary information to the recipient device 720. For instance, the sender device 710 may communicate a sender hash (e.g., the sender temporary address 714) and/or the first address 712 to the receiving device 720. This may be through optical recognition, where the sender device 710 generates a visual output for display (e.g., alpha-numeric code, a QR code, a bar code, and the like). The receiving device 720 may then obtain the sender hash and/or the first address 712 by scanning the display of the sender device 710 using an optical sensor (e.g., a camera).

Additionally or alternatively, as depicted by element 730, the recipient device 720 may communicate the necessary information to the sender device 710. The recipient device 720 may communicate a hash (e.g., the recipient temporary address 716) and/or a second address 722 to the sender device 710. By way of example, the receiving device 720 may generate a visual output for display (e.g., alpha-numeric code, a QR code, a bar code, and the like). The sender device 710 may then obtain recipient hash and/or the second address 722 by scanning the display of the recipient device 720 using an optical sensor (e.g., a camera).

In various embodiments, a computing device can then confirm the temporary address by deciphering the received hash (e.g., a recipient hash and/or a sending hash). To decipher a hash, the computing device may generate a hash value by hashing the received public key (e.g., a digital address) with its own location parameters and/or set of location parameters. As described above, the public key may be hashed by salting the cryptographic hash function with one or more location parameters. If the computing devices share similar location parameters, the hash value generated by the first device may correspond to the hash received by the counterparty device.

It should be appreciated that any degree of accuracy in measuring the location of the device may be used so that the devices have corresponding location parameters despite the distance (e.g., 10 feet, 50 feet, and/or 100 feet) between the devices. Said differently, the location parameters may be measured with various degrees of specificity so that the devices will have corresponding location parameters despite slight differences in sensor measurement and/or despite being separated by some measurable distance. For example, the counterparty devices may round a particular decimal in GPS coordinates so that the devices share similar location parameters despite being physically spaced apart. In some embodiments, the location parameters may be measured with respect to a particular zone. If a particular GPS coordinate relates to a specific zone, the location parameter of the zone may be used.

As noted, the location parameters may be used in deciphering a received hash. As illustrated in FIG. 7, the sender device 710 may decipher the recipient hash. In some instances, the recipient hash is the recipient temporary address 716. The sender device 710 can decipher the recipient hash by hashing the second address 722 with the device's location parameters. Using same cryptographic hashing function that was used to initially generate the recipient temporary address 716, the sender device 710 hashes the second address 722 along with its own location parameters. The sender device 710 can generate a hash value and determine whether the hash value corresponds to the sender temporary address 714. For example, as long as the devices share a similar physical location, where the sending device's location parameters are similar to the recipient device's location parameters, the hashed value generated by the sender device 710 may correspond to the recipient temporary address 716. If they correspond, the sender device 710 may confirm the recipient temporary address 716 and generate a request to transfer a token/coin to the recipient temporary address 716. Additionally or alternatively, the generated request can include an indication that the deciphered recipient hash corresponds to the recipient temporary address 716. If they do not correspond, the sender device 710 may not transfer the token. As a further example, it may not authorize the transaction of the token/coin, which can be used by a node to validate the transaction.

In some embodiments, a sender device may be associated with a private/public key pair to sign the transaction. For example, if the sender device 710 confirms the recipient temporary address 716, it may generate a request to transfer the token/coin. It is contemplated that the token/coin may be transferred from either the first address 712 or the sender temporary address 714. The sender device 710 may digitally sign the generated request using a sender key. In various embodiments, the sender key is a private/public key pair associated with the sender device.

Based on generating the request, the sender device can then communicate the generated request to a node of a plurality of nodes that collectively maintain a distributed ledger. While not shown, as described herein, each of the plurality of nodes is configured to store a transaction that corresponds to a request based at least in part on a determination that the token/coin is associated with the sender address and that the communicated request is digitally signed with the sender key.

Still referencing FIG. 7, the recipient device 720 may decipher a sender hash to confirm the sender temporary address 714. The recipient device 720 can decipher the sender by hashing the first address 712 with the device's location parameters. Using same cryptographic hashing function that was used to initially generate the sender temporary address 714, recipient device 720 hashes the first address 712 along with its own location parameters. The recipient device 720 can thus generate a hash value and determine whether the hash value corresponds to the sender temporary address 714. For example, as long as the devices share a similar physical location, where the receiving device's location parameters are similar to the sending device's location parameters, the hashed value generated by the recipient device 720 may correspond to the sender temporary address 714. If they correspond, the recipient device 720 may confirm the sender temporary address 714 and enable the transfer of a token/coin. If they do not correspond, the recipient device 720 may not confirm the sender temporary address 714 and not enable the transfer of the token/coin. For example, by not confirming the sender temporary address 714, the recipient device 720 may not unencumber the token/coin that is being transferred. As a further example, the recipient device 720 may not authorize the transaction of the token/coin, which can be used by a node to validate the transaction.

In various embodiments, there may be a predetermined time limit to transfer the token/coin. For example, the token/coin must complete a particular transaction stream (e.g., the first transaction stream 724, the second transaction stream 726, and/or the third transaction stream 728), and/or individual transactions within that stream, must be completed within a predetermined time limit. If the individual transaction and/or the entire transaction stream does not occur within the predetermined time limit, the transfer of the token may fail. For example, if the predetermined time limit expires, the transfer of the token may not be validated by a node for addition to the one or more distributed ledgers.

In some embodiments, a computing device (e.g., the recipient device 720 and/or the sender device 710) may access a node of a plurality of nodes that collectively maintain the distributed ledger. The computing device may then search the distributed ledger. For example, the computing device may search the distributed ledger for the one or more addresses associated with the transaction (e.g., the first address 712, the sender temporary address 714, the second address 722, and/or the recipient temporary address 716). If the computing device identifies the transaction, it may determine whether the transaction includes an indication that the deciphered hash (e.g., the recipient hash and/or the sender hash) corresponds to the respective temporary address (e.g., the sender temporary address 714 and/or the recipient temporary address 716).

Figure 8:
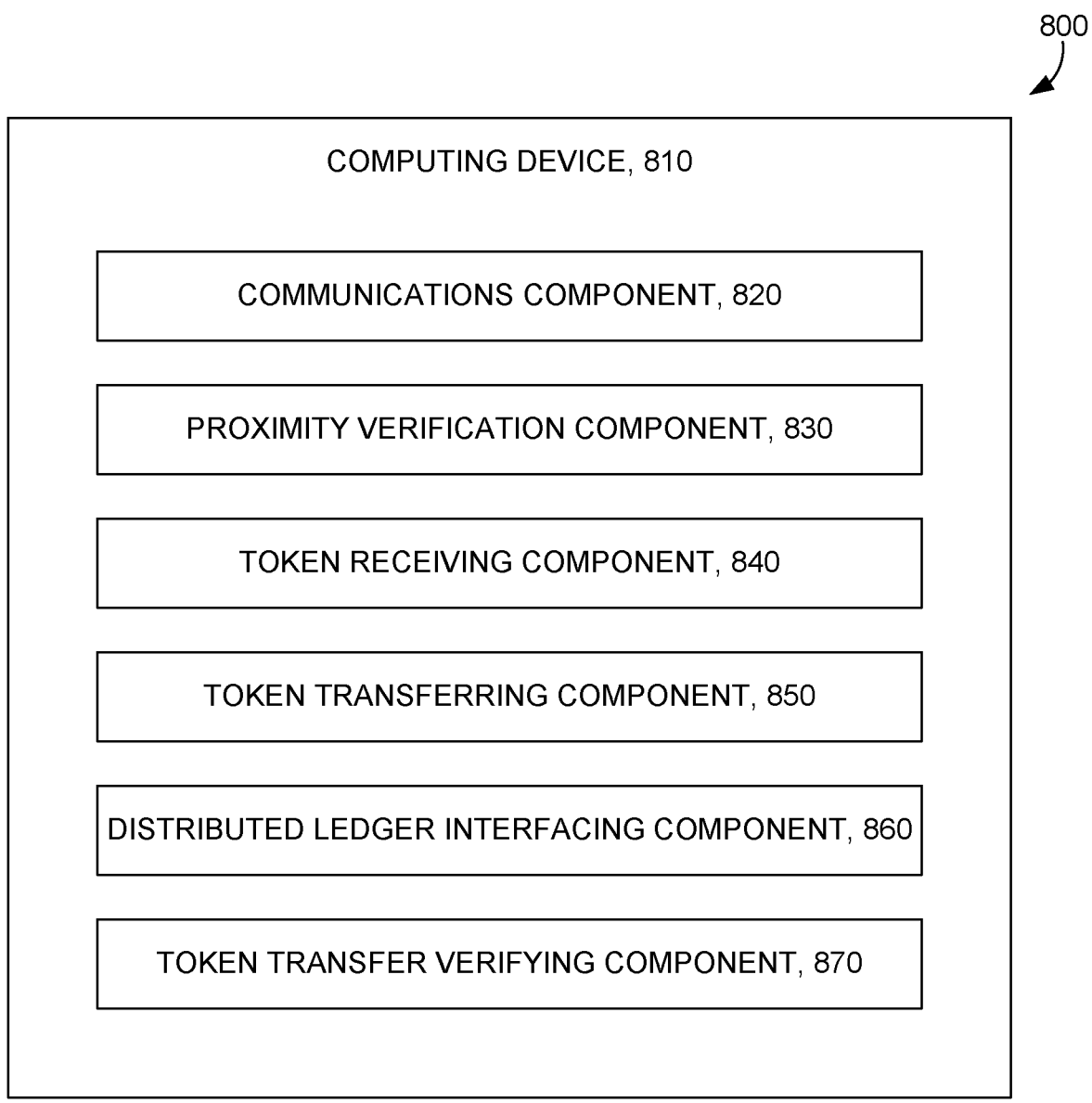
FIG. 8 is a block diagram of various component in a system that can be used to practice various embodiments of the present disclosure.

Referring now to FIG. 8, a block diagram of an exemplary computing device 810 (such as computing device 110 and/or computing node 100) is depicted. The block diagram illustrates components used in transferring a token/coin between a first address and a second address. In some embodiments, at least one of the first address and/or the second address is a temporary address (such as the first temporary address 420 and/or the second temporary address 430). As described, the temporary address may be generated based on a public key (also referred to as an address) and the device's location parameters. For example, the temporary address may be generated by salting hashing of a public key with a set of location parameters.

The components described may be employed on a computing device associated with a transferor (e.g., sender device 710). Additionally or alternatively, it is contemplated that the components may be employed on a computing device associated with the transferee 412 (e.g., recipient device 720).

As shown in FIG. 8, in various embodiments, the computing device comprises a proximity verification component 830. The proximity verification component 830 generally verifies that a computing device 810 is near a counterparty device by deciphering a hash. In some embodiments, to decipher the hash, both the hash (e.g., a temporary digital address) and a public key are received from a counterparty device. The hash and public key may be received from a counterparty device by any means of communication.

In some embodiments, the proximity verification component 830 receives the information through a communication medium that requires the counterparty devices to be physically proximate (e.g., physically located near one another within a certain range). In a non-limiting example, the proximity verification component 830 may be coupled to an optical sensor (e.g., a camera) associated with the computing device 810. If a counterparty device displays a hash and a public key, the proximity verification component 830 may receive the hash and the public key via the optical sensor. In some embodiments, wireless communication used to transfer the hash and a public key. For example, the proximity verification component 830 may use a short-range wireless transmission protocol, including NFC, Bluetooth, and the like. Accordingly, the proximity verification component 830 may receive information, such as a hash and a public key, via the wireless communication sensor, through a transmission by the counterparty device.

The proximity verification component 830 may then decipher the received hash using the information received from the counterparty device and a hashing algorithm. In some embodiments, the received hash may be deciphered based on one or more location parameters corresponding to a detected location of the computing device 810. The proximity verification component 830 may be coupled to one or more location sensors to detect one or more location parameters. For example, the proximity verification component 830 may be coupled to a location sensor to detect one or more of GPS signals, WiFi signals, Bluetooth signals, and/or radio tower signals. These signals can be represented by GPS coordinates, wireless signal identifiers, and/or radio tower identifiers. The proximity verification component 830 may then generate a hashed value based on hashing the device's detected location parameters and the received public key (e.g., an address). In other words, the public key associated with the counterparty device may be hashed along with the detected location parameters of the computing device 810.

In some embodiments, the proximity verification component 830 may determine if the hashed value corresponds to a digital address. In some embodiments, the proximity verification component 830 determines if the hashed value corresponds to a digital address that is received from a counterparty computing device. In some embodiments, the digital address is the recipient's address that will receive the token/coin. As described, the proximity verification component 830 may obtain a digital address (e.g., a temporary address) from a counterparty device via an optical sensor and/or a wireless communication sensor. If the hash matches the received digital address, then the proximity verification component 830 may verify that the counterparty device is physically proximate to the computing device 810. If the hash does not match the received digital address, then the proximity component may not verify that another computing device is in physical proximity to the computing device 810.

In various embodiments, the computing device 810 comprises a token receiving component 840. The token receiving component 840 generally allows the computing device 810 to generate a hash that can be confirmed by a counterparty device. The token receiving component 840 may generate the hash based on one or more detected location parameters. As such, the token receiving component 840 may be coupled to one or more location sensors to detect one or more location parameters. For example, the token receiving component 840 may be coupled to a location sensor to detect one or more of GPS signals, WiFi signals, Bluetooth signals, and/or radio tower signals. These signals can be represented by GPS coordinates, wireless signal identifiers, and/or radio tower identifiers.

The token receiving component 840 may utilize the one or more detected location parameters to generate a hash. For example, the token receiving component 840 may hash the detected location parameter(s) with a public key. As described herein, the public key may be hashed by salting the hash with a location parameter. The token receiving component 840 may thus generate a hashed value that is communicated to a counterparty device.

In some embodiments, both the public key (e.g., an address) and the hashed value are communicated to the counterparty device. The token receiving component 840 may be coupled to one or more communication components 820 of the computing device 810 so as to communicate with a counterparty device. For instance, the token receiving component 840 may be coupled to a display associated with the computing device 810. The computing device 810 can thus display information (e.g., an address and/or a hash) that is detectable by a counterparty device via an optical sensor. As another example, the token receiving component 840 may be coupled to a wireless communication sensor (e.g., an antenna, a Bluetooth chip). Accordingly, the token receiving component 840 may transmit information (e.g., an address and/or a hash) to another device via the wireless communication sensor. In some embodiments, the wireless communication may be limited to transmission protocols that require both devices to be physically proximate to one another, including NFC, Bluetooth, and the like.

In various embodiments, a computing device comprises a token transferring component 850. At a high level, the token transferring component 850 generates a request to transfer a token/coin from a first address to a second address. The token transferring component 850 may receive a determination from the proximity verification component 830 that another computing device is nearby (e.g., within a physical proximity or has a similar or same set of location parameters). In particular, the token transferring component 850 may receive a determination that the received and deciphered hash corresponds to a temporary address of a counterparty device. Based on receiving the determination, the token transferring component 850 may generate a digitally-signed transaction based on a public/private key pair to transfer a token/coin. In some further embodiments, the generated transaction can further include a physical proximity indicator, such as a flag or a value (e.g., true or false) that indicates that a determination has been made that a physical proximity between the transferring computing device and the receiving computing device has been verified. In this regard, any subsequent references to the generated transaction can provide a recollectible indication that the transfer was made while the devices were in physical proximity with one another.

In various embodiments, a computing device comprises a distributed ledger interfacing component 860. Generally, the distributed ledger interfacing component 860 communicates a generated transaction to a node that maintains a distributed ledger. Based on receiving a determination that the received and deciphered hash corresponds to the second address from the token transferring component 850, the distributed ledger interfacing component 860 may request to transfer the digital token from the first address to the second address. As such, the distributed ledger interfacing component 860 may communicate the generated transaction to any node of a plurality of nodes maintaining a distributed ledger. In some embodiments, the distributed ledger interfacing component 860 may communicate the generated transaction to the node over a network.

In some embodiments, the computing device 810 may comprise a token transfer verifying component 870. The token transfer verifying component 870 can determine whether a node storing the distributed ledger includes the generated transaction. For example, the token transfer verifying component 870 may access a node maintaining the distributed ledger. As noted, in embodiments where the node is remote from the computing device, the transfer verifying component may cause the computing device to access the node over the network. The token transfer verifying component 870 may then cause the computing device to search the distributed ledger for the generated transaction. The token transfer verifying component 870 may search the distributed ledger based on any information that might identify the transaction. By way of example only, the token transfer verifying component 870 may search the distributed ledger using the first address. As a further example, the token transfer verifying component 870 may search the distributed ledger using the first address. If the token transfer verifying component 870 identifies the transaction, it can determine that the transaction has been added to the distributed ledger. The token transfer verifying component 870 may then generate an electronic communication notifying a transferee and/or a transferor that the transaction is complete.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for verifying physical proximity of counterparties in digital asset transfers, the method comprising:
   receiving, by a sender device, a recipient hash and a recipient wallet address communicated from a recipient device, the recipient hash and the recipient wallet address being associated with the recipient device, wherein the recipient device, is configured to generate the recipient hash with a hash function based on each of the recipient wallet address and a first set of location coordinates that corresponds to a recipient device physical location;
   receiving, by the sender device, a set of signals at a sender device physical location;
   detecting, by the sender device, a second set of location coordinates based on the set of signals, the second set of location coordinates corresponding to the sender device physical location;
   generating, by the sender device, a hash value with the hash function based on the recipient wallet address and the second set of location coordinates;
   verifying, by the sender device, that the recipient device and the sender device have same location coordinates based on a determination that the hash value corresponds to the recipient hash received from the recipient device; and
   transferring, by the sender device, a digital token from a sender wallet address associated with the sender device to the recipient wallet address based on the determination that the hash value corresponds to the recipient hash,
   wherein the step of transferring the digital token from the sender wallet address to the recipient wallet address further includes generating a request to transfer the digital token to the recipient wallet address, the request including a digital signature of the sender device, wherein the request is communicated to and authenticated by a distributed ledger network based on the digital signature, and the digital token is transferred based further on the authenticated digital signature.

2. The computer-implemented method of claim 1, wherein the recipient hash is generated based on the first set of location coordinates being utilized to salt the hash function for hashing the recipient wallet address.

3. The computer-implemented method of claim 1, wherein the signals include at least one of optical signals, GPS signals, Wi-Fi signals, Bluetooth signals, or radio tower signals.

4. The computer-implemented method of claim 1, wherein the digital token corresponds to a unique identifier associated with a physical asset.

5. The computer-implemented method of claim 4, wherein the transfer of the digital token corresponds to a physical transfer of the physical asset.

6. The computer-implemented method of claim 1, wherein each of the recipient wallet address and the recipient hash is received via at least one of a QR code, a wireless signal, a NFC signal, or a RFID signal communicated from the recipient device.

7. The computer-implemented method of claim 1, wherein the request includes an indication that the hash value corresponds to the recipient hash.

8. One or more non-transitory computer storage media storing computer-usable instructions that, when executed by one or more processors, cause the one or more processors to perform operations comprising:
   generating a recipient hash with a hash function based on each of a recipient wallet address and a first set of location coordinates that corresponds to a recipient device physical location;
   receiving the recipient hash and the recipient wallet address, the recipient hash and the recipient wallet address being associated with the recipient device;
   receiving a set of signals at a sender device physical location;
   detecting a second set of location coordinates based on the set of signals, the second set of location coordinates corresponding to the sender device physical location;
   generating a hash value with the hash function based on the recipient wallet address and the second set of location coordinates;
   verifying that the recipient device and the sender device have same location coordinates based on a determination that the hash value corresponds to the recipient hash and
   transferring a digital token from a sender wallet address associated with the sender device to the recipient wallet address based on the determination that the hash value corresponds to the recipient hash,
   wherein transferring the digital token from the sender wallet address to the recipient wallet address further includes generating a request to transfer the digital token to the recipient wallet address the request including a digital signature of the sender device, wherein the request is communicated to and authenticated by a distributed ledger network based on the digital signature, and the digital token is transferred based further on the authenticated digital signature.

9. The one or more non-transitory computer storage media of claim 8, wherein the recipient hash is generated based on the first set of location coordinates being utilized to salt the hash function that is configured to hash the recipient wallet address.

10. The one or more non-transitory computer storage media of claim 8, wherein the digital token corresponds to a unique identifier associated with a physical asset.

11. A computerized system, comprising:
   a recipient device configured to:
   detect a first set of location coordinates that corresponds to the recipient device physical location;
   generate a recipient hash based on the first set of location coordinates, a hash function, and a recipient wallet address; and
   a sender device configured to:
   receive the recipient hash and the recipient wallet address communicated from the recipient device, the recipient hash and the recipient wallet address being associated with the recipient device;
   receive a set of signals at a sender device physical location;
   detect a second set of location coordinates based on the set of signals, the second set of location coordinates corresponding to the sender device physical location;

generate a hash value with the hash function based on the recipient wallet address and the second set of location coordinates;

verify that the recipient device and the sender device have same location coordinates based on a determination that the hash value corresponds to the recipient hash received from the recipient device; and transfer a digital token from a sender wallet address associated with the sender device to the recipient wallet address based on the determination that the hash value corresponds to the recipient hash, wherein transferring the digital token from the sender wallet address to the recipient wallet address further includes generating a request to transfer the digital token to the recipient wallet address, the request including a digital signature of the sender device, wherein the request is communicated to and authenticated by a distributed ledger network based on the digital signature, and the digital token is transferred based further on the authenticated digital signature.

12. The system of claim 11, wherein the recipient device is further configured to:

generate the recipient hash utilizing the first set of location coordinates to salt the hash function.

13. The system of claim 11, wherein the sender device is further configured to:

generate the hash value utilizing the second set of location coordinates to salt the hash function.

\* \* \* \* \*

UNITED STATES PATENT AND TRADEMARK OFFICE
CERTIFICATE OF CORRECTION

| | |
|---|---|
| PATENT NO. | : 11,922,363 B2 |
| APPLICATION NO. | : 16/125053 |
| DATED | : March 5, 2024 |
| INVENTOR(S) | : Robert J. Gillen |

It is certified that error appears in the above-identified patent and that said Letters Patent is hereby corrected as shown below:

In the Claims

Column 47, Line 19, Claim 1, in the line reading "wherein the recipient device, is configured to generate" should read --wherein the recipient device is configured to generate--.

Column 48, Line 37, Claim 8, in the line reading "token to the recipient wallet address the request includ-" should read --token to the recipient wallet address, the request includ- --.

Signed and Sealed this
Twenty-eighth Day of May, 2024

Katherine Kelly Vidal
*Director of the United States Patent and Trademark Office*